US012807240B2

(12) United States Patent
Daoust et al.

(10) Patent No.: US 12,807,240 B2
(45) Date of Patent: Nov. 24, 2026

(54) REINFORCED AERODYNAMIC SKIRT

(71) Applicant: TRANSTEX INC., Montreal (CA)

(72) Inventors: Sylvain Daoust, Vaudreuil-Dorion (CA); Pierre-Yves Lacroix, Laval (CA); Robin Gaudreau, Saint-Colomban (CA)

( * ) Notice: Subject to any disclaimer, the term of this patent is extended or adjusted under 35 U.S.C. 154(b) by 0 days.

(21) Appl. No.: 18/857,099

(22) PCT Filed: Nov. 16, 2023

(86) PCT No.: PCT/CA2023/051544
§ 371 (c)(1),
(2) Date: Oct. 15, 2024

(87) PCT Pub. No.: WO2024/103183
PCT Pub. Date: May 23, 2024

(65) Prior Publication Data

US 2025/0269911 A1 Aug. 28, 2025

Related U.S. Application Data

(60) Provisional application No. 63/425,908, filed on Nov. 16, 2022.

(51) Int. Cl.
*B62D 35/00* (2006.01)

(52) U.S. Cl.
CPC .......... *B62D 35/002* (2013.01); *B62D 35/008* (2013.01)

(58) Field of Classification Search
CPC ... B62D 35/001; B62D 35/002; B62D 35/008
See application file for complete search history.

(56) References Cited

U.S. PATENT DOCUMENTS 7,578,541 B2 * 8/2009 Layfield ............... B62D 35/001 296/180.2
10,196,099 B2 * 2/2019 Grandominico ..... B62D 35/001

FOREIGN PATENT DOCUMENTS

CA 2762860 8/2012
CA 3105549 4/2022

* cited by examiner

*Primary Examiner* — Lori Lyjak
(74) *Attorney, Agent, or Firm* — Decode Legal Inc.; Mathieu Audet

(57) ABSTRACT

A resilient strut assembly adapted to secure an aerodynamic skirt panel to a trailer is presented, the aerodynamic skirt structure being adapted to be substantially longitudinally mounted to the trailer, the resilient strut assembly being adapted to sustain an elastic deformation when a load is applied to the resilient strut assembly when the skirt panel moves away from the configuration and to self-recover its original position when the load is removed without the deformation extending over a limit deformation. The resilient structure comprises a first resilient strut and a complementary strut limiting flexion of the skirt panel.

20 Claims, 22 Drawing Sheets

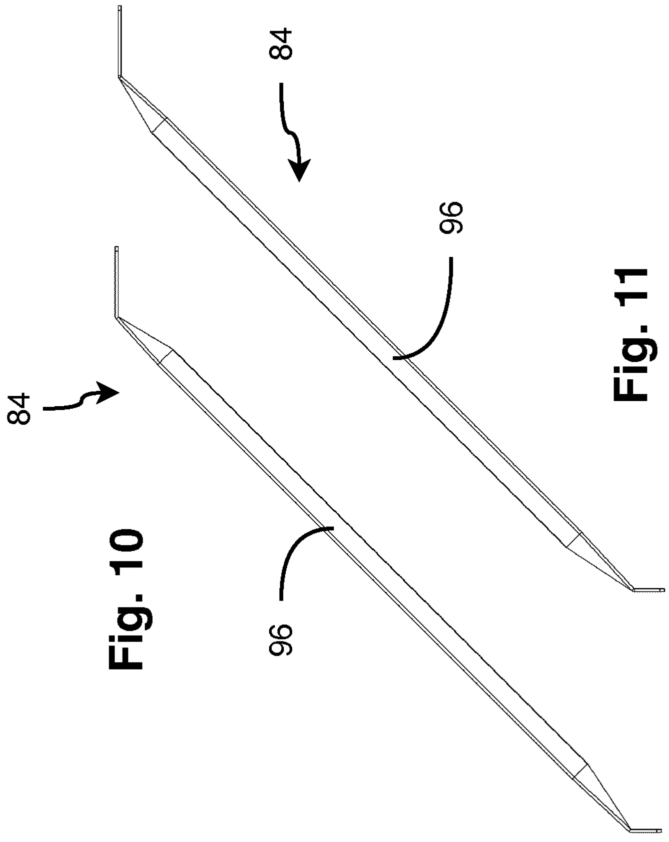
Fig. 10
Fig. 11
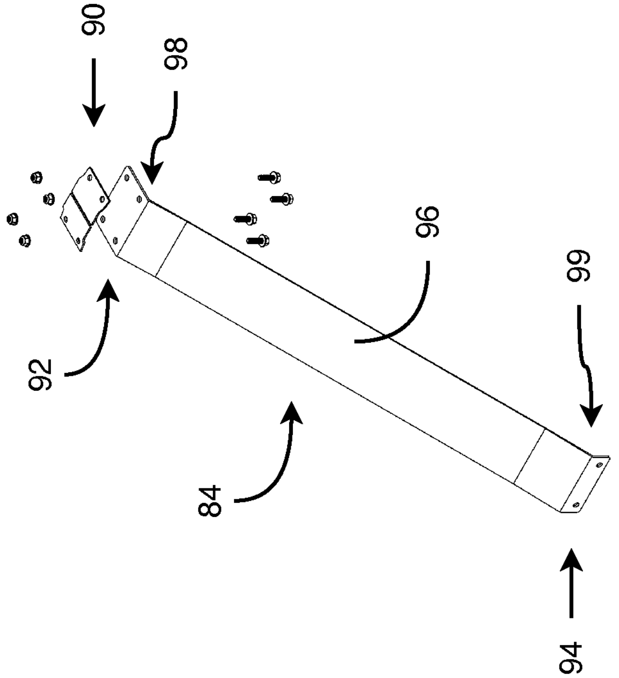
Fig. 9

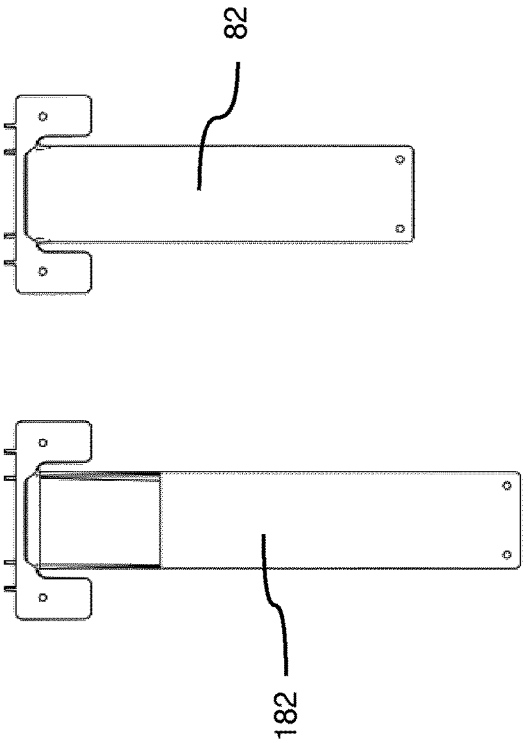
Fig. 38B
Fig. 38A
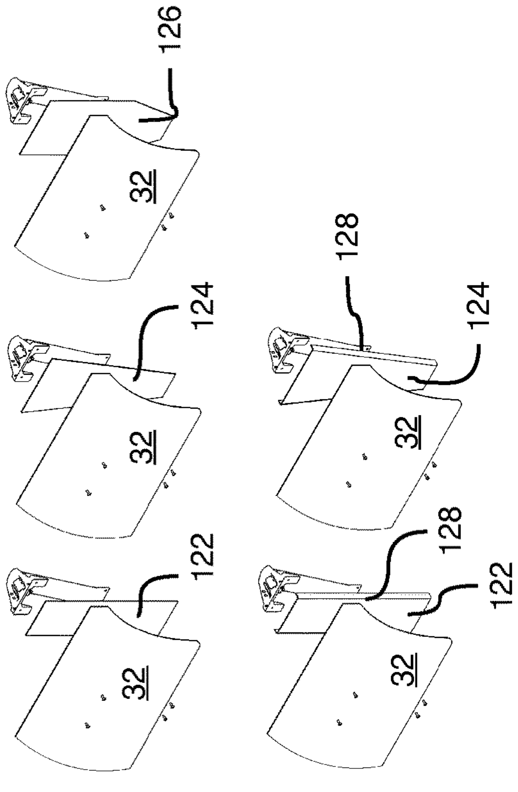
Fig. 37A
Fig. 37B
Fig. 37C
Fig. 37D
Fig. 37E

REINFORCED AERODYNAMIC SKIRT

CROSS-REFERENCE TO RELATED APPLICATION

This application relates to and is a non-provisional application claiming priority under 35 U.S.C. § 119(e) from U.S. patent application No. 63/425,908, filed Nov. 16, 2022, under 35 U.S.C. § 111, entitled REINFORCED AERODYNAMIC SKIRT, the specification of which is hereby incorporated herein by reference in its entirety.

BACKGROUND

(a) Field

This invention relates to aerodynamic trailer skirts adapted to be mounted on trailers to improve the aerodynamic efficiency of the trailer. The present invention more precisely relates to resilient members for supporting aerodynamic trailer skirts.

(b) Related Prior Art

Road tractors are used to pull road trailers on roads to transport cargo. Aerodynamic apparatuses are installed on the road tractor and/or on the road trailer in order to reduce the aerodynamic air drag and improve fuel efficiency.

Trailer skirts made of rigid materials are installed on both sides of a road trailer to help manage the flow of air around and underneath the trailer. Brackets, also made of rigid material, are affixed to the trailer to secure the skirts positioned thereto. These skirts are secured to the bottom portion of the trailer, or on the sides of the trailer's floor, to ensure proper positioning when the vehicle is moving.

People who are familiar with the trucking industry know that trailers are subject to hazardous road conditions. The skirts, because of their position under the trailer's floor and their proximity with the road, are significantly vulnerable and might easily enter in contact with surrounding obstacles. The brackets holding the skirts, when put under significant stress, plastically bend and/or break to affect the skirts' position in respect to the road trailer thus reducing the efficiency of the skirts. Moreover, the skirt itself might bend and/or break if they contact a foreign object. This also increases the operation cost and the maintenance time that is required.

The shape of the skirts, and their respective positions on the road trailer, have a significant effect on the aerodynamics efficiency of the road trailer.

Therefore, there exists a need in the art for an improved aerodynamic skirt assembly over the existing art. There is a need in the art for such a resilient skirt assembly that can be easily installed and economically manufactured.

SUMMARY OF THE INVENTION

It is one aspect of the present invention to alleviate one or more of the drawbacks of the background art by addressing one or more of the existing needs in the art.

Accordingly, embodiments of this invention provide an improved trailer skirt over the prior art.

In some aspects, the techniques described herein relate to a strut assembly adapted to mount a skirt panel to a vehicle having a floor and a longitudinal center plane, the strut assembly including: a first resilient strut adapted to be mounted to the floor, the first resilient strut including at least one mounting portion adapted for the skirt panel to be secured thereto, wherein the first resilient strut is adapted to allow the skirt panel to flex between a flexed position, when undergoing an external force, and to self-restore to a default original position when the external force is released: and a complementary strut adapted to be coupled to at least two of a) the skirt panel, b) the first resilient strut, and c) the floor of the vehicle, wherein the complementary strut is adapted, when the external force is exerted over the skirt panel towards the center plane, for at least one of: i) providing resistance to the skirt panel: and ii) limiting flexion of the skirt panel.

In some aspects, the techniques described herein relate to a strut assembly, wherein the complementary strut operates only when the external force has a component directed toward the center plane of the vehicle.

In some aspects, the techniques described herein relate to a strut assembly, wherein the complementary strut begins to operate only after the skirt panel has flexed over a threshold value greater than 0 compared to the default position.

In some aspects, the techniques described herein relate to a strut assembly, wherein the complementary strut includes a first end fixedly secured and a second end distant to the first end that is slidingly secured.

In some aspects, the techniques described herein relate to a strut assembly, wherein the first resilient strut includes a resilient-strut body adapted to extend at a first angle oblique relative to the skirt panel, and the complementary strut includes a complementary-strut body that extends at a second angle oblique relative to the skirt panel.

In some aspects, the techniques described herein relate to a strut assembly, wherein the first angle and the second angle are of different values.

In some aspects, the techniques described herein relate to a strut assembly, wherein at least one end of the complementary strut is secured about an end of the body of the first resilient strut.

In some aspects, the techniques described herein relate to a strut assembly, wherein the first resilient strut includes a second mounting portion for mounting to the floor of the vehicle, and wherein the complementary strut includes a wedge portion wedged between the second mounting portion and the floor of the vehicle.

In some aspects, the techniques described herein relate to a strut assembly, wherein the first resilient strut is adapted to resiliently buckle when undergoing the force having a component over a threshold value towards the center plane, wherein the complementary strut is adapted to resist to the force at least one of i) limiting and ii) preventing the first resilient strut to buckle when combined to the first resilient strut.

In some aspects, the techniques described herein relate to a strut assembly, wherein the first resilient strut includes a body adapted to extend at a first angle oblique relative to the skirt panel, and the complementary strut includes a body that extends parallel to the skirt panel.

In some aspects, the techniques described herein relate to a strut assembly, wherein the complementary strut includes a body to be mounted oblique to the floor and the skirt panel, and an extension to be mounted parallel to the floor.

In some aspects, the techniques described herein relate to a strut assembly, wherein the first resilient strut includes a second mounting portion for securing the skirt panel thereto distant to the first mounting portion, and wherein the complementary strut includes a third mounting portion for securing the skirt panel thereto distant to the first mounting portion and to the second mounting portion.

In some aspects, the techniques described herein relate to a strut assembly, wherein the complementary strut has a body having a non-flat shape.

In some aspects, the techniques described herein relate to a strut assembly, wherein the non-flat shape includes a concave face and a convex face opposed to the concave face.

In some aspects, the techniques described herein relate to a vehicle including a skirt panel and at least two strut assemblies, wherein the strut assemblies are mounted to the floor of the vehicle distant to each other, and wherein the skirt panel is secured to the two strut assemblies.

In some aspects, the techniques described herein relate to a vehicle including: a floor: a center plane: a skirt-panel assembly including: a resilient strut mounted to the floor: a skirt panel secured to at least the resilient strut: and a complementary strut coupled to at least two of a) the skirt panel, b) the resilient strut, and c) the floor of the vehicle, wherein the resilient strut and the complementary strut are adapted, when undergoing an external force having a component toward the center plane, to allow the skirt panel of the vehicle to flex toward the center plane, and wherein the complementary strut prevents the skirt panel to flex over a threshold value beyond which the skirt-panel assembly loses ability to self-restore to the skirt panel to a default original position.

In some aspects, the techniques described herein relate to a vehicle, including a first number of the resilient struts and a second number of the complementary struts, wherein the first number and the second number are unequal.

In some aspects, the techniques described herein relate to a vehicle, wherein the skirt panel is coupled to the resilient strut at a first lowest height, and wherein the skirt panel is coupled to the complementary strut at a second lowest height that is not higher that the first lowest height.

In some aspects, the techniques described herein relate to a vehicle, wherein the complementary strut includes a first end secured to the skirt panel or to the resilient strut, and a second end distant from the first end that is coupled to one of the first resilient strut and the floor of the vehicle.

In some aspects, the techniques described herein relate to a vehicle, wherein the complementary strut includes a wedge portion that is wedged between the floor and the resilient strut.

An embodiment of the invention provides a skirt assembly and an improved resilient strut assembly adapted to be installed on a road vehicle or a road trailer to reduce the aerodynamic drag produced by the movement of the road trailer when pulled by a tractor while being adapted to sustain an elastic deformation when a load is applied to the resilient strut assembly when the skirt panel moves away from the configuration and to self-recover its original shape when the load is removed within a limit deformation.

BRIEF DESCRIPTION OF THE DRAWINGS

Further features and advantages of the present disclosure will become apparent from the following detailed description, taken in combination with the appended drawings, in which:

FIG. 9 is an exploded perspective view of the second strut of FIG. 8;

FIGS. 10 and 11 are side views of embodiments of a second strut related to the second strut of FIG. 8, wherein the depicted second strut respectively features a generally downward extending shape and a generally upwardly extending shape;

FIGS. 37A-E are exploded perspective views of a portion of a skirt, a strut adapted to mount the skirt thereto, and different reinforcement pieces in accordance with embodiments;

FIGS. 38A and 38B are front views of two resilient struts, a first one adapted to resist to a first force and a second adapted to resist to a second force different than the first force in accordance with an embodiment;

It will be noted that throughout the appended drawings, like features are identified by like reference numerals.

DETAILED DESCRIPTION

Figure 1:
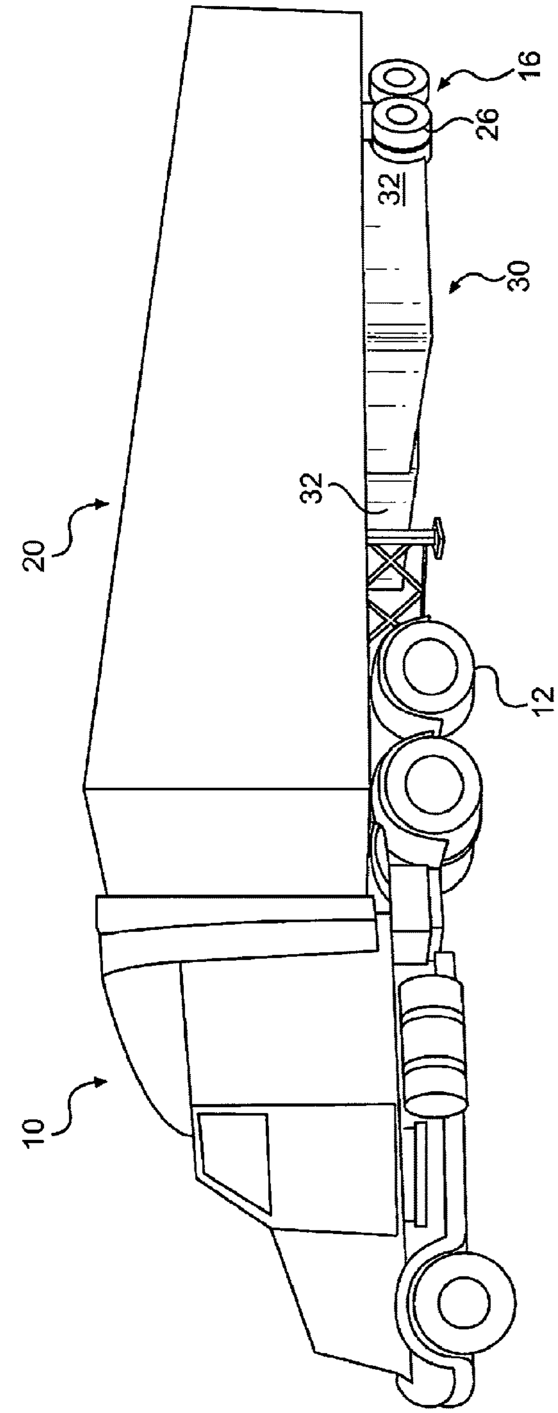
FIG. 1 is a perspective view of a road tractor hauling a road trailer, with a skirt mounted thereto in accordance with an embodiment.
Figure 2:
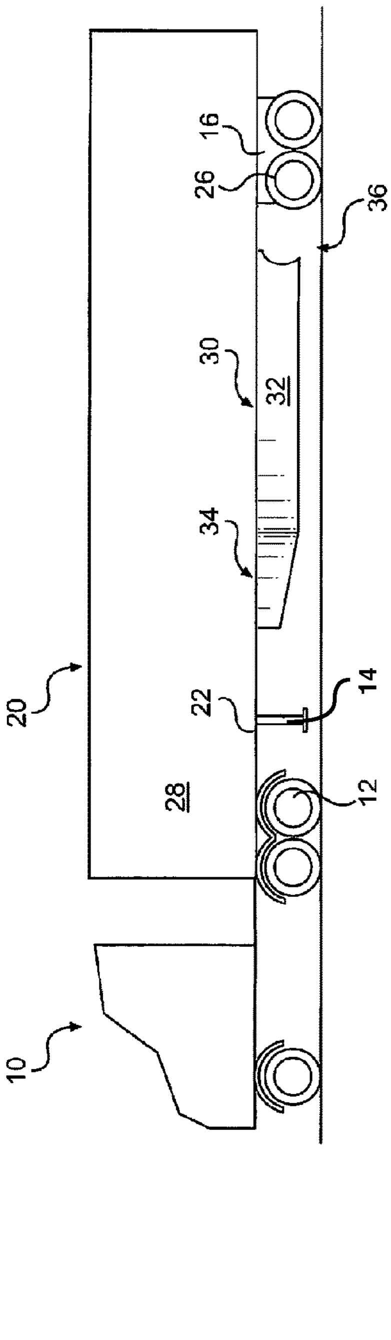
FIGS. 2 and 3 are respectively a side view and a bottom plan view of the road tractor and road trailer of FIG. 1.

The realizations will now be described more fully hereinafter with reference to the accompanying figures, in which realizations are illustrated. The foregoing may, however, be embodied in many different forms and should not be construed as limited to the illustrated realizations set forth herein.

With respect to the present description, references to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term “or” should generally be understood to mean “and/or” and so forth.

Recitation of ranges of values and herein or on the drawings are not intended to be limiting, referring instead individually to any and all values falling within the range, unless otherwise indicated herein, and each separate value within such a range is incorporated into the specification as if it were individually recited herein. The words “about”, “approximately”, or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described realizations. The use of any and all examples, or exemplary language (“e.g.,” “such as”, or the like) provided herein, is intended merely to better illuminate the exemplary realizations and does not pose a limitation on the scope of the realizations. No language in the specification should be construed as indicating any unclaimed element as essential to the practice of the realizations. The use of the term “substantially” is intended to mean “for the most part” or “essentially” depending on the context. It is to be construed as indicating that some deviation from the word it qualifies is acceptable as would be appreciated by one of ordinary skill in the art to operate satisfactorily for the intended purpose.

In the following description, it is understood that terms such as “first”, “second”, “top”, “bottom”, “above”, “below”, and the like, are words of convenience and are not to be construed as limiting terms.

The terms “top”, “up”, “upper”, “bottom”, “lower”, “down”, “vertical”, “horizontal”, “interior” and “exterior” and the like are intended to be construed in their normal meaning in relation with normal installation of the product.

It should further be noted that for purposes of this disclosure, the term “coupled” means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members, or the two members and any additional intermediate members being integrally formed as a single unitary body with one another or with the two members or the two members and any additional intermediate members being attached to one another. Such joining may be permanent in nature or alternatively may be removable or releasable in nature.

It should further be noted that regardless of the present description being provided with the example of a road trailer, alternative embodiments are available for other vehicles, hauled or self-propelled, without disporting from the scope of the description.

FIGS. 1, 2, 3 and 4 illustrate a road tractor 10 with a road trailer 20 attached thereto equipped with a pair of skirt assemblies 30, installed on each side of the road trailer 20, adapted to deflect and direct the airflow around the road trailer 20. Each skirt assembly 30 includes a skirt panel 32, adapted to be disposed on the side of the road trailer 20, and a plurality of securing members adapted to secure the skirt panel 32 to the road trailer 20. The securing members are not illustrated on FIGS. 1, 2, 3 and 4 and will be discussed in more details later in this specification. Once installed on the road trailer 20, the skirt assembly 30 helps channel the flow of air around the road trailer 20 to reduce the air drag of the vehicle when the road trailer 20 moves on the road, pulled by the road tractor 10.

The skirt assembly 30 of the present embodiment is mostly located under the road trailer 20, between the wheels 12 of the road tractor 10 and the wheels 26 of the road trailer 20. The skirt panels 32 can alternatively extend forward up to the trailer supports 14 of the road trailer 20, and be secured thereto, thus preventing complex skirt panel arrangements through the trailer supports 14. The skirt panels 32 are substantially vertically positioned on each side of the road trailer 20 with a clearance with the ground illustratively about 15-25 centimeters (about 6 to 10 inches). The air management around the trailer 20 provided by the skirt assembly 30 reduces the air drag created by the road trailer 20 by directing the flow of air around the road trailer 20. The flow of air would otherwise turbulently move around and below the road trailer 20 to create substantial air drag. The airflow management around the road trailer 20 provided by the skirt assembly 30 helps maintain laminar airflow around the road trailer 20 that helps diminish fuel consumption of the road tractor 10. The skirt assembly 30 also improves the safety of the vehicle by providing a barrier that can significantly prevent pedestrians and cyclists to get under the road trailer 20.

The skirt panel 32 can also be used to display advertising thereon. Each skirt panel 32 provides additional display area in addition to the road trailer's wall 22.

As illustrated, the skirt panel 32 is shaped with an optional progressive height from the forwardmost portion 34. The skirt panels 32 can alternatively also be installed at an angle, in respect to the vertical, on the road trailer 20 to change the airflow pattern around the road trailer 20 and more precisely adjust the aerodynamics to a specific vehicle shape.

Figure 3:
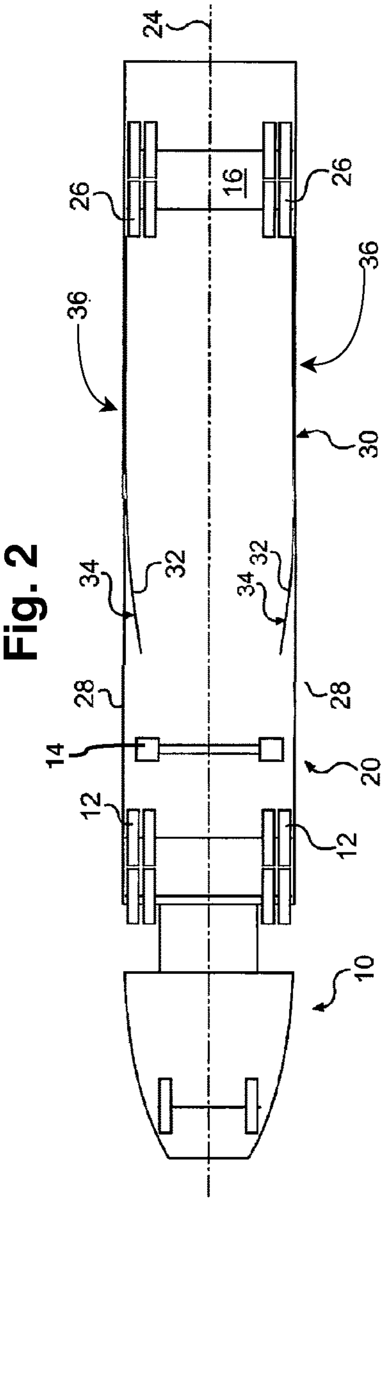
Figure 4:
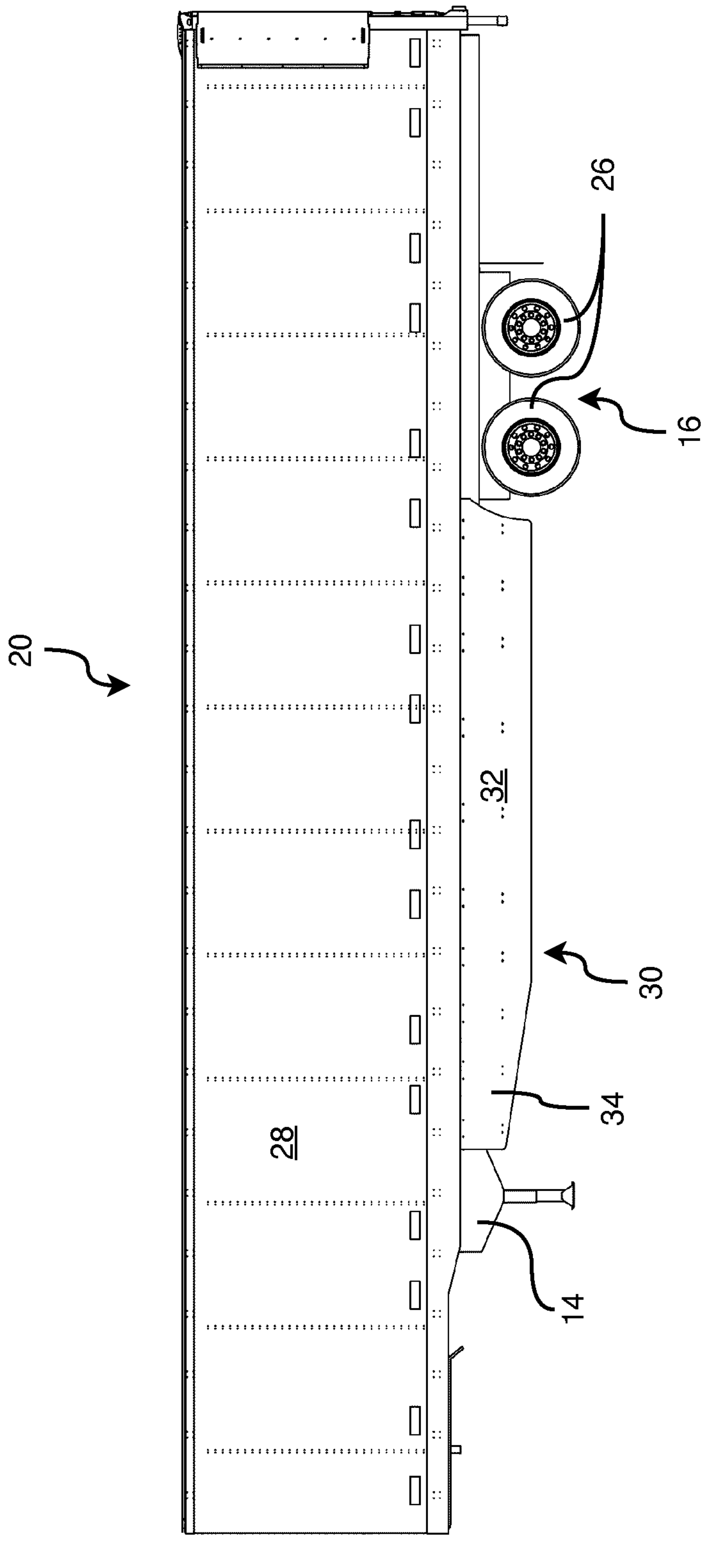
FIG. 4 is a side view of a road trailer of FIG. 1 in accordance with an embodiment.

It can be appreciated from FIG. 3 that each skirt panel 32 is installed directly on the side of the road trailer 20 and, when seen from above, have a front portion 34 that progressively proximally leans toward the centerline 24, or longitudinal vertical center plane 24, of the road trailer 20. The recessed front portion 34 of the skirt panel 32 improves the collection of the turbulent airflow generated by the road tractor 10 thus improving the acrodynamic efficiency of the skirt assembly 30. Additional explanation about the shape of the skirt panel 32 will be provided in further details below.

Figure 5:
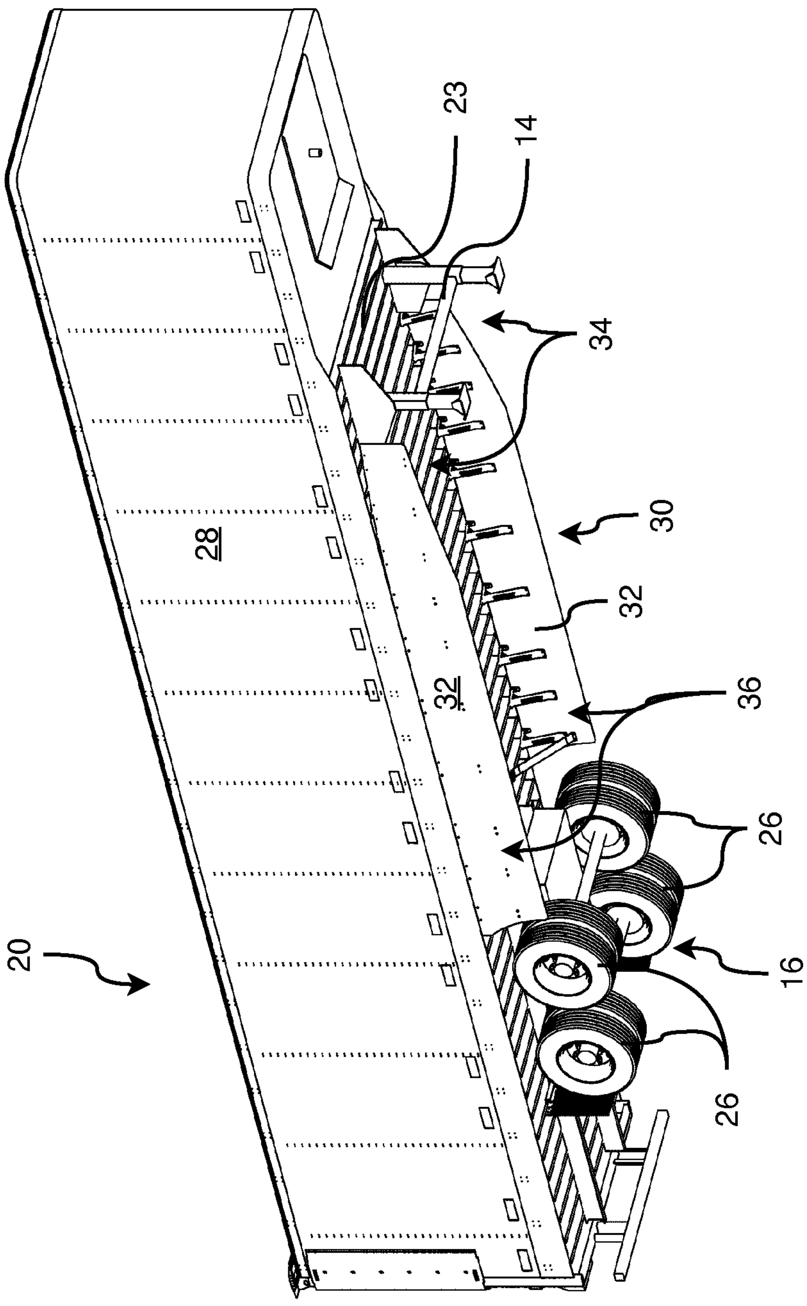
FIG. 5 is a perspective bottom view of the road trailer of FIG. 4 with the use of a resilient strut assembly to mount the skirt to the road trailer at one of the mounting positions in accordance with an embodiment.

FIG. 5 is a bottom perspective view of the skirt assembly 30 installed on the road trailer 20 from which is only illustrated a series of frame members 23 forming a portion of the road trailer floor frame 22. The rear portion 36 of the skirt panel 32 is preferably positioned on the edge of the road trailer's wall 28. It is also encompassed by the present invention that the skirt panel 32 be installed a little in recess about the side of the road trailer 20 to avoid winches, lights, toolbox, or ladders located on the side/edge of the road trailer 20. In contrast, it can be appreciated that the front portion 34 of the skirt panel 32 is progressively positioned and secured toward the centerline 24 of the road trailer 20. The skirt panel 32 is secured adjacent to the frame 22 with a series of optional angle supports (not depicted) secured to both the frame members 23 and the skirt panel 32. Lower, the skirt panel 32 is secured to the road trailer 20 with a series of intervening resilient struts 42 also secured to both the frame members 23 and the skirt panel 32.

Figure 6:
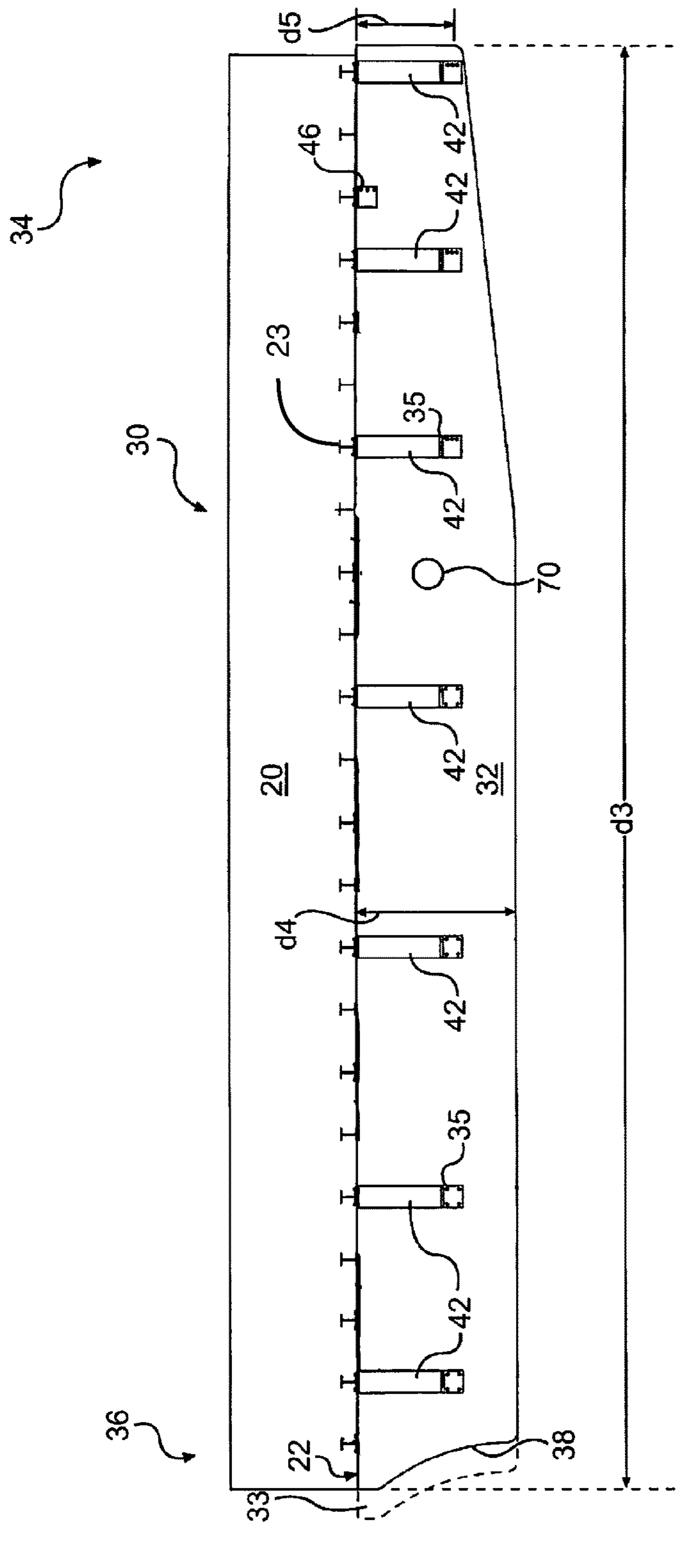
FIG. 6 is a side view of the skirt mounted to a portion of the floor of the road trailer of FIG. 1.

Referring to FIG. 6, it can be appreciated that holes (not depicted) disposed on a top portion of the skirt panel 32 are used to fasten the skirt panel 32 to respective (optional) angle supports 40 (not depicted) that, themselves, are secured to frame members 23, e.g., I-beams 23, of the road trailer 20. A number of connection points between the skirt panel 32 and the road trailer 20 are used to ensure the skirt panel 32 is well secured to the road trailer 20 and will not vibrate or deflect (some degree of deflection can be acceptable under certain conditions) during operation. The series of holes (not depicted) disposed on a lower portion of the skirt panel 32 are adapted to fasten to an end of each resilient strut 42. Similarly, the other end of the resilient strut 42 is connected to the frame members 23, e.g., I-beams 23, of the road trailer 20 via a fastener mechanism.

A curved portion 38 is defined on the rear portion 36 of the skirt panel 32 and preferably corresponds to the exterior shape of the adjacent wheel 26 of the road trailer 20. In so doing, it is possible to install the skirt panel 32 close to the wheel 26 without risking any contact therebetween. The skirt panel 32 should be installed as close as possible to the road trailer wheels 26 to maximize its efficiency. It is preferable to leave a distance between the wheel 26 of the road trailer 20 and the skirt panel 32 to avoid any risk of interference therebetween.

The wheels 26 of a road trailer 20 are commonly adapted to be longitudinally adjustable to distribute the mass of the road trailer 20 in a desired fashion. The adjustment of the position of the axles of a road trailer 20 is desirable, for instance, when a heavy load is carried or during thaw and freeze periods. In this respect, and to avoid reinstalling the skirt panel 32 in various positions on the road trailer 20, it might be desirable to install the skirt panel 32 in respect with the forwardmost possible position of the axles of the road trailer 20. That would prevent to remove and reposition the skirt panel 32 when the position of the bogie 16 is modified.

The road trailer wheels 26 are mounted on a road trailer bogie 16 adapted to move the wheels 26 along a portion of the road trailer's length to distribute the weight of the road trailer 20 in a desired fashion. The skirt assembly 30 is preferably permanently secured to the road trailer 20 taking in consideration the forwardmost position of the trailer bogie 16. The gap between the skirt panel 32 and the road trailer's wheels 26 is however increased when the trailer bogie 16 is move toward the rear of the road trailer 20 thus likely reducing the aerodynamic efficiency of the skirt assembly 30. Available is a skirt panel extension module 33 adapted to reduce the gap between the skirt panel 32 and the road trailer's wheels 26 to prevent any aerodynamic efficiency reduction. The skirt panel extension modules 33 are secured to the road trailer in a similar fashion. The skirt panel extension module 33 can be provided in various lengths to fill gaps of various sizes. They can also be provided as a skirt panel extension modules' kit. An alternate embodiment provides a sliding skirt panel extension 33 that is permanently secured to the road trailer 20 and extendable to the desired length when the trailer bogie 16 is moved.

A skirt panel extension 33, illustrated on FIG. 6, can alternatively be added between the skirt panel 32 and the wheels 26 when the axles of the road trailer 20 are located in a rearward position leaving an increased distance therebetween to improve the acrodynamic efficiency of the skirt assembly 30. A reasonable distance between the skirt panel 32 and the wheels 26 could be between about 15 centimeters and about 30 centimeters although a shorter distance, or even a superposition of the skirt panel 32 (or skirt panel module(s) 33) over the wheel 26, can be achieved.

It can be appreciated from FIG. 5 that the skirt panel 32 is disposed inwardly on the forward portion of the road trailer 20 and is progressively located on the edge of the road trailer's wall 28 toward the rear end of the road trailer 20. A departure angle strut is secured to the road trailer 20 to correctly locate the skirt panel 32 on the road trailer 20. The departure angle strut is installed on the trailer 20 prior to install the skirt panel 32. The rear portion 36 of the skirt panel 32 is secured to the road trailer 20 up to the departure angle strut and then the skirt panel 32 is bent to reach the forward angle strut and secured thereto. That bent locates the skirt panel 32 to the road trailer 20 and defines the shape of the skirt panel 32 with the desired progressive proximal bent. The remaining resilient struts 42 are installed thereafter to further secure the assembly.

The rear portion 36 of the skirt panel 32 is intended to be secured to the road trailer to leave only a minimum gap with the road trailer wheels 26 to improve the aerodynamic efficiency of the skirt assembly 30. The skirt panel 32 extends to the front of the road trailer 20 and defines a curve portion on its front portion 34. A long skirt 32 appears to be more efficient than a shorter skirt panel 32 and should therefore extend as far as possible to the front of the road trailer 20. However, for reasons of complexity, the front portion 34 of the skirt panel 32 is likely to stop at the trailer supports 14. It is nonetheless encompassed by the present invention that the skirt panel 32 alternatively extends in front of the trailer supports 14. The lowermost portion of the front portion 34 of the skirt panel 32 is provided with a radius thereof as depicted.

In an embodiment of the invention adapted to fit a standard 16.1 meters (53 feet) road trailer 20 the forward end of the departure angle support is located at a distance d1 (not identified on Figures) from the forward end of the skirt panel 32. A forward angle strut is secured to the frame at a distance d2 (not identified on Figures) from the side edge of the road trailer 20. Distance d1 is about between 1.5 meter and 3 meters, preferably about between 2 meters and 2.5 meters and most preferably about between 2.1 meters and 2.4 meters. Distance d2 is about between 0.20 meter and 0.40 meter, preferably about between 0.25 meter and 0.35 meter and most preferably about 0.27 meter and 0.32 meters. More precisely, distance d1 is preferably about 2.29 meters and distance d2 is preferably about 0.31 meter in a preferred embodiment. Corresponding angle struts 40 and resilient struts 42 are installed to further secure the skirt panel 32 at the desired position.

A left side elevational view schematically illustrating, on FIG. 6, the overall size of the skirt panel 32. Length d3 of the skirt panel 32 is about between 5 meters and 9 meters, preferably about between 5 meters and 8 meters and most preferably about between about 5.8 meters and 7.0 meters. The height d4 of the skirt panel 32 is about between 0.5 meter and 1 meter, preferably about between 0.6 meter and 0.9 meter and most preferably about between 0.7 meter and 0.8 meter. And the forwardmost height d5 of the skirt panel 32 is about between 0.3 meter and 0.7 meter, preferably about between 0.4 meter and 0.6 meter and most preferably about 0.572 meter. More precisely, distance d4 is preferably about 0.76 meter and distance d5 is preferably about 0.48 meter in a preferred embodiment.

Alternate embodiments providing a skirt assembly sized and designed to fit road trailers of different lengths can be inferred from the dimensions discussed above. For instance, a skirt assembly can be designed to fit a 14.6 meters (48 feet) road trailer 20 or any other sizes and lengths of road trailers 20.

In one embodiment, the skirt panel 32 is made of composite material. Recommended multilayer composite material, fiber reinforced polypropylene, a combination of a polypropylene component and woven component, or reinforced thermoplastic is used in the present embodiment. The composite material forming the skirt panel 32 of the illustrative example, in a first embodiment depicted on FIGS. 1-6, is shaped in a planar material adapted to allow the skirt panel 32 to bend to adopt the desired shape and further when the skirt panel 32 is pushed toward the centerline of the road trailer 20 (proximally) when, for instance, contacting an obstacle or having a force applied thereon. The skirt panel 32 bends, allowing displacement of particularly the bottom portion of the skirt panel 32, and is adapted to retrieve its original position when the force is removed from the skirt panel 32, thereby preventing breakages that would result from such forces is the material and mounting components were not resilient. As schematically illustrated in FIG. 6, the skirt panel 32 may be provided with a series of holes 35 used to connect the skirt panel 32 to struts when mounting to the road trailer 20. The resilient struts 42 are mounted to the frame member, i.e. I-beams 23 of the trailer. The holes 35 can be factory pre-drilled or can be drilled during installation to ensure desired customization. Rivets or bolts may be placed in the holes 35 to secure the skirt panel 32 to the struts. Other appropriate fastening mechanism variations well known in the art are encompassed by the present disclosure and can be used without departing from the scope of the invention.

An opening (not depicted) may be defined in the skirt panel 32 to allow access to e.g., an optional fuel tank (not depicted) disposed on the road trailer 20 to fuel an onboard generator or freezer. Such a fuel tank is commonly disposed under the floor 22 of the road trailer 20 and is most likely hidden by the skirt assembly 30. The opening is sized, designed, and located on the skirt panel 32 to allow access to the fuel tank. A door (not illustrated) can optionally be added to close the opening.

In view of the necessary resilient characteristics discussed before, it is desirable to have the skirt assembly able to undertake a first level of deformation after which the deformation of the skirt is limited to prevent e.g., people and foreign objects impacting the skirt to e.g., risk falling in front of the wheels and thus to be rolled over.

Figure 7:
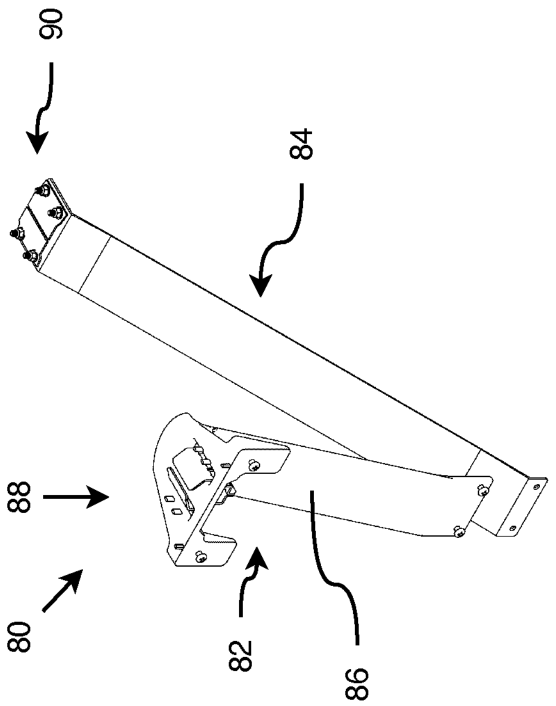
FIG. 7 is a perspective elevation view of a resilient strut structure in accordance with an embodiment.
Figure 12:
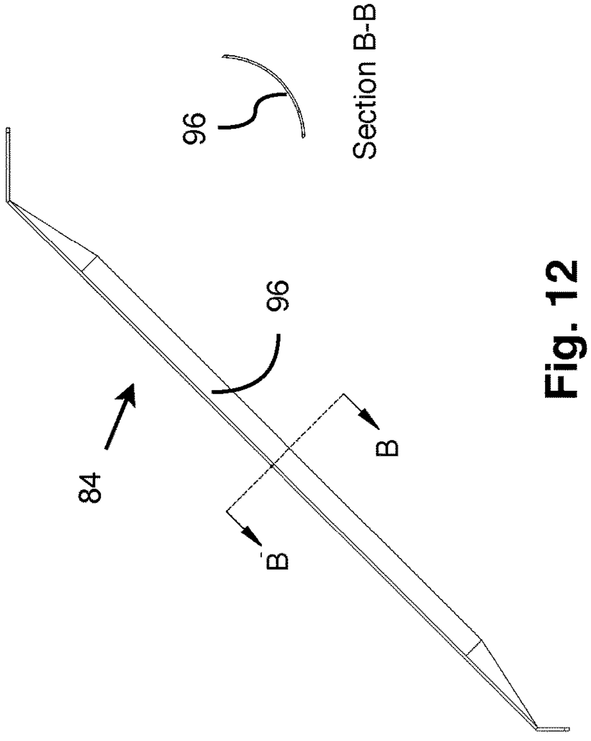
FIG. 12 is a side view and cross-section a second strut related to the second strut of FIG. 8 featuring a generally downwardly extending arc shape.
Figure 13:
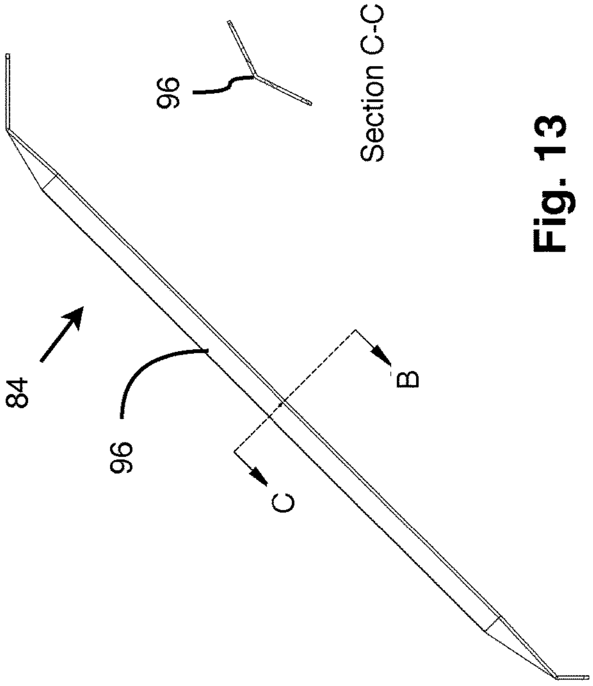
FIG. 13 is a side view and cross-section a second strut related to the second strut of FIG. 8 featuring a generally upwardly extending V shape.

Referring to FIG. 7, a resilient strut assembly 80 comprises a first resilient strut 82 adapted for the skirt panel to be thereto about its top and a to be mounted thereto somewhere between its top and its bottom. The first resilient strut 82, according to an embodiment, is adapted to resiliently buckle when undergoing a force exceeding a threshold value, The resilient strut assembly 80 comprises a second strut 84, or more generally a complementary strut 84, adapted to be mounted to the road trailer farther from the side to an I-beam, thereby at an angle farther from the vertical than the body 86 of the first resilient strut 82. In other words, the bodies of the first resilient strut 82 and the second strut 84 are oblique relative to the skirt panel, and more precisely at different angles. It allows the first resilient strut 82 and the second strut 84 to combine to resist to forces applied to the skirt panel and to limit the deformation of the skirt panel to a limit value under a standard exterior force directed toward the centerline. That limit value is explained in more details below.

In an embodiment, the first resilient strut 82 and the section strut 84 are adapted to be mounted to a common I-beam, have different lengths, and respond to exterior forces exerted thereon in the direction of the centerline of the road trailer with different resistances.

In an embodiment, the first resilient strut 82 and the second strut 84 are configured to be mounted with jaw components 88 & 90 adapted to grip the bottom flange of the I-beams using, e.g., bolts to secure, e.g., the jaw components 90 to the bottom flange of the I-beam.

Figure 8:
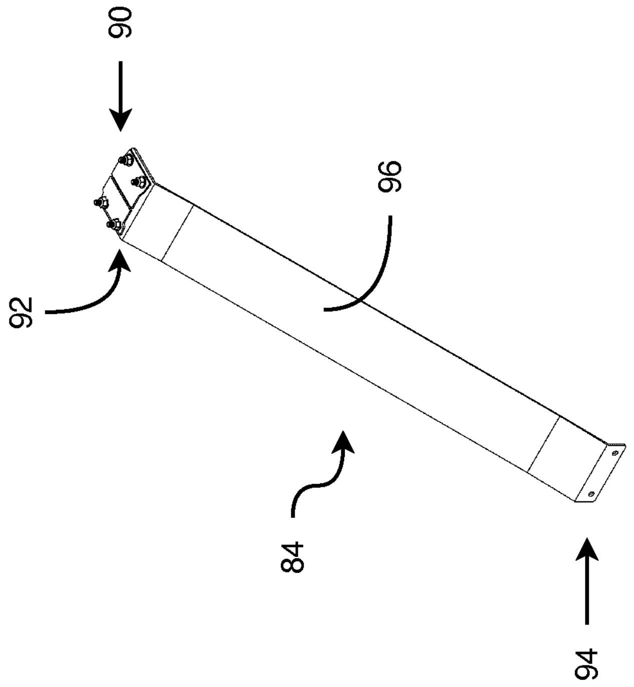
FIG. 8 is a perspective view of the second strut of the resilient strut assembly of FIG. 7.

Referring additionally to FIGS. 8 and 9, the second strut 84 comprises a head-mount portion 92 adapted to grip the flange of an I-beam, a skirt-mount portion 94, approximatively at 90 degrees from the head-mount portion 92, adapted to secure the skirt panel thereto, and a body 96 extending at a non-zero angle from the mount portions 92 & 94 and joining the mount portions 92 & 94.

Referring additionally to FIGS. 10 to 14, the body 96 has a non-flat shape adapted to provide resistance to flexion, allowing the skirt panel 30 to flex between a default original position, e.g., the position adopted by the skirt panel 30 when no external force is exerted thereon; and a flexed position not over a limit value, e.g., a limit position acceptable to protect the space under the vehicle, which limit position may be achieved through elastic deformation and beyond which no flexion is possible without plastic deformation or break of material of e.g., the skirt panel 30, providing thereby signs of unacceptable flexion of the skirt panel 30. The skirt panel 30 is further able to self-restore to the original position when the skirt panel 30 is released from external force. According to embodiments, the body 96 has either a generally V-shape or a U-shape, wherein the apex of the shape of the body 96 is according to first embodiments, facing upward, and, according to second embodiments, facing downward. Accordingly, the body 96 comprises a concave face and a convex face opposed to the concave face.

Figure 32:
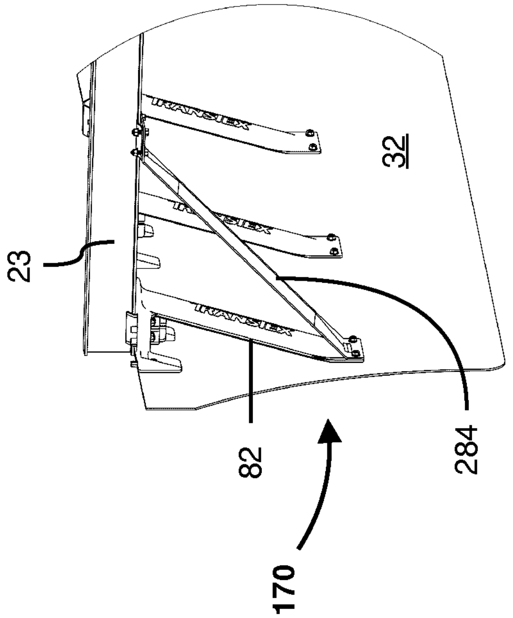
FIG. 32 is a perspective view of an end portion of a skirt mounted to I-beams of a road trailer using a two first resilient struts and a resilient strut assembly in accordance with an embodiment.
Figure 33:
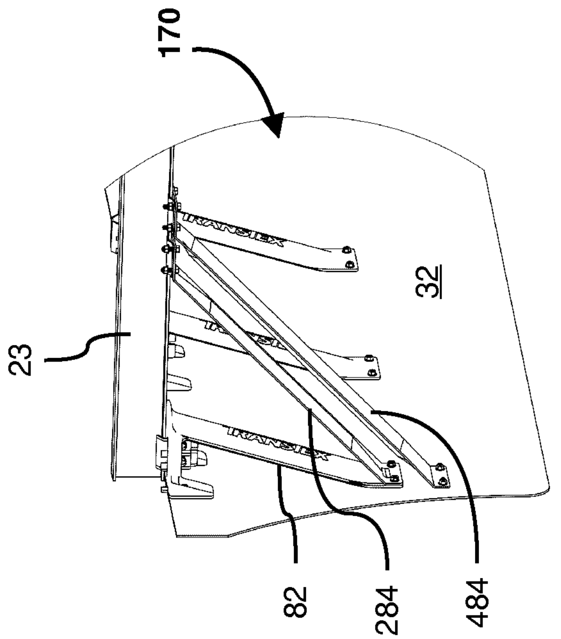
FIG. 33 is a perspective view of an end portion of a skirt mounted to I-beams of a road trailer using a two first resilient struts and a resilient strut assembly comprising a third strut in accordance with an embodiment.
Figure 34:
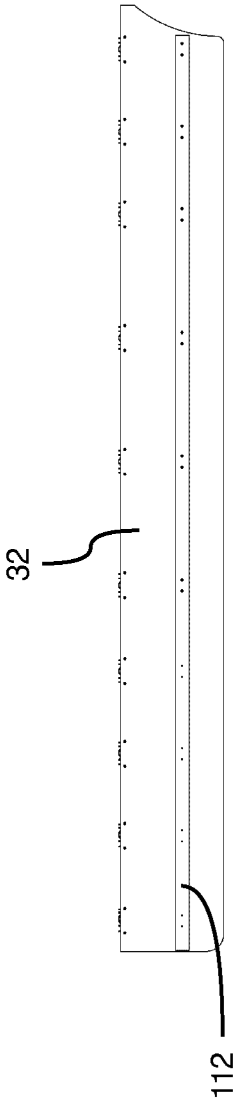
FIG. 34 is a side view of a skirt with a longitudinal reinforcement band secured thereto at about the center height of the skirt in accordance with an embodiment.
Figure 35A:
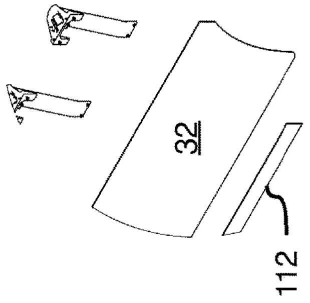
FIGS. 35A-C are tree exploded perspective views of a portion of a skirt, struts used to mount the skirt, and a reinforcement band to be secured about the bottom, about the center and about the top of the skirt in accordance with embodiments.
Figure 35B:
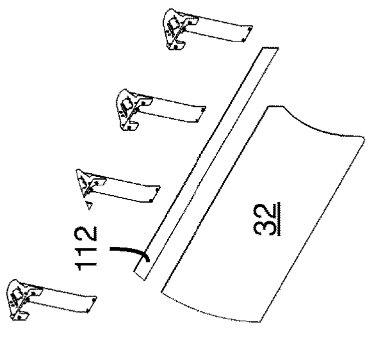
Figure 35C:
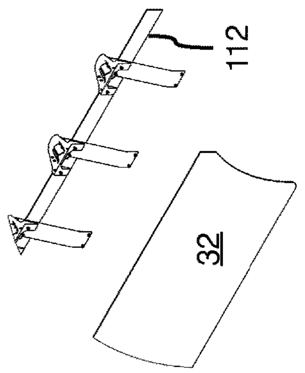
Figure 36:
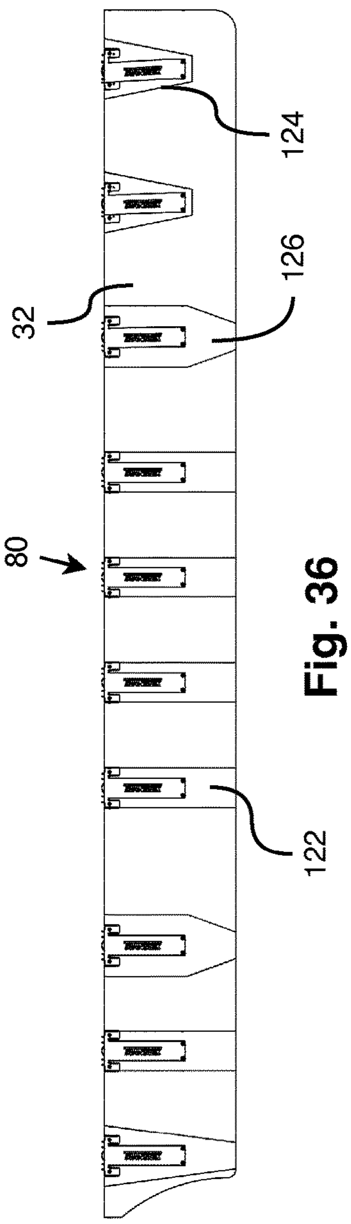
FIG. 36 is a side view of the inside face of a skirt and struts used to mount the skirt, wherein reinforcement pieces are mounted between the skirt and the struts in accordance with an embodiment.

According to a perspective, assembly of the skirt panel 30 secured to one or more first resilient struts 82 combined with or coupled to one or more complementary struts 84 sum up to a skirt-panel assembly, e.g., skirt panel assembly 170 depicted and identified in FIG. 32 and in FIG. 33 for instances.

According to an embodiment, the second strut 84 is made from cutting and shaping a sheet of e.g., aluminum into the second strut 84.

According to an embodiment, the first resilient strut 82 is made of polymer, and the second strut 84 is made of metal.

According to embodiments, the second strut features joints 98, 99 at the junction of the body 96 to the mount portions 92 & 94 that allow changes of angle therebetween without the joints 98 & 99 breaking.

Referring additionally to FIGS. 15A to 15D, the second strut 84 is designed to be mounted aligned with the general direction of the I-beam it is mounted thereto. In embodiments, a wedge 102 is used at the location of mounting of the skirt panel 32 to the skirt-mount portion 94 to adopt the longitudinal difference of angle between the skit-mount portion 94 and the skirt panel 30, occurring particularly at the front of the skirt panel (e.g., FIGS. 3 and 5). The wedge 102 allows to the second strut 84 and the skirt panel 32 to be secured to each other without the securing exerting torsion forces in the skirt panel 32. In some embodiments (not depicted), oblong holes and/or resilient mounting components, e.g., rubber rings, may be used when securing the skirt panel 32 to the second strut 84.

Figure 15A:
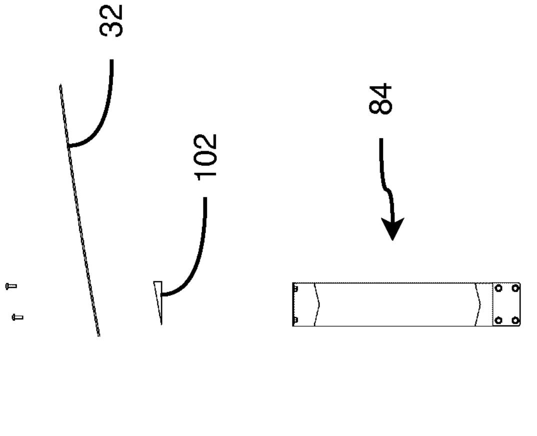
FIG. 15A is an elevation view of a second strut related to the second strut of FIG. 8 and a wedge used to mount the skirt of the second strut.
Figure 14:
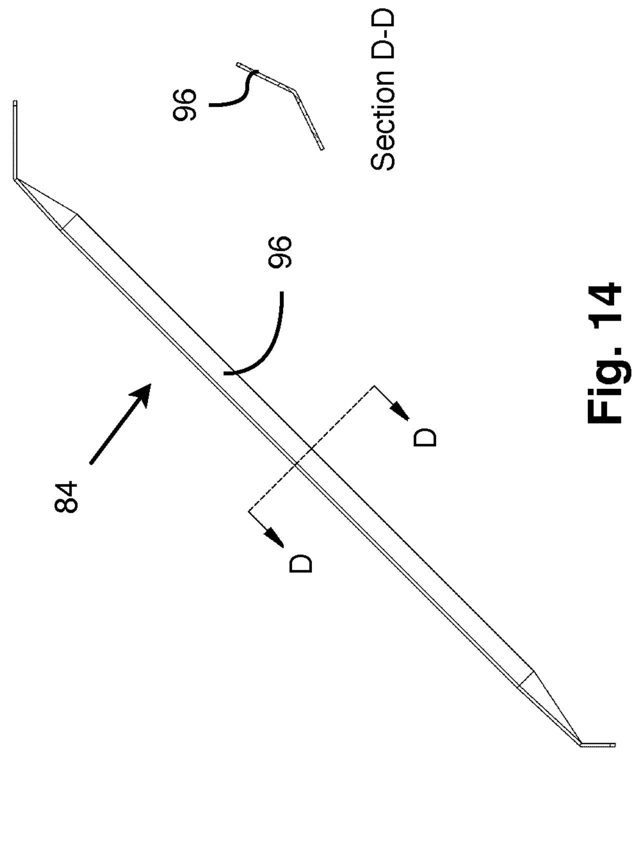
FIG. 14 is a side view and cross-section a second strut related to the second strut of FIG. 8 featuring a generally downwardly extending V shape.
Figure 15B:
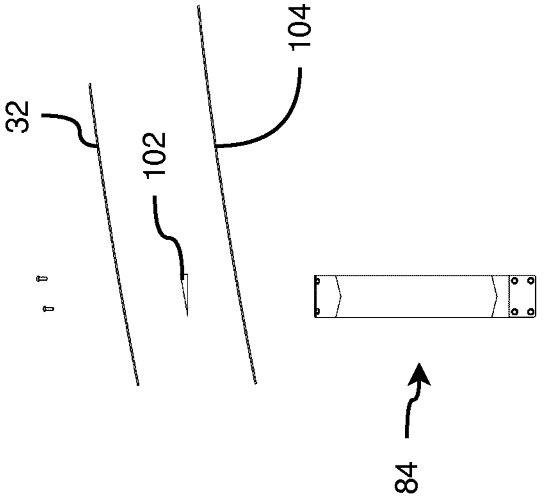
FIG. 15B is an elevation view of a second strut related to the second strut of FIG. 8 and a wedge used to mount the skirt of the second strut and a second mounting layer.

According to embodiments, the wedge 102 may be mounted between second strut 84 and the skirt panel 32, e.g., FIG. 15A, or in-between the skirt panel 32 and an additional layer 104, e.g., FIG. 15B.

Figure 15C:
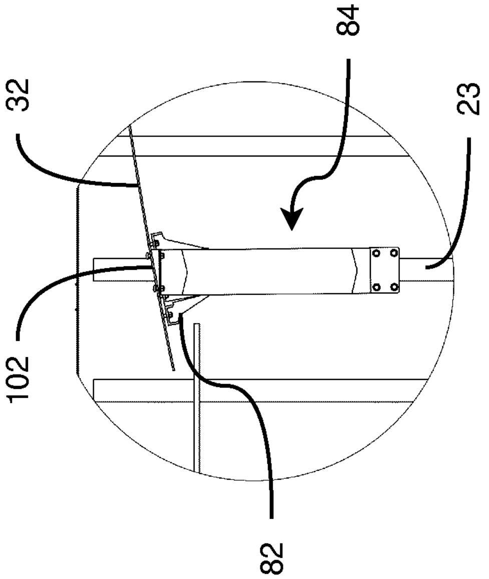
FIG. 15C is bottom view of a skirt mounted to a first resilient strut and a second strut using a wedge.

Referring to FIG. 15C, it is visible that the wedge 102 allows to secure the skirt panel 32 to the first resilient strut 82 and to the second strut 84 when the struts 82 & 84 are at different angles.

Figure 15D:
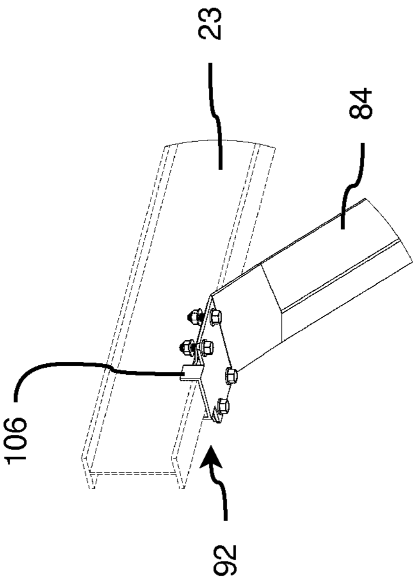
FIG. 15D is a perspective view of the head-mount portion of a second strut related to the second strut of FIG. 8 featuring alignment wings.

Referring to FIG. 15D, in embodiments the second strut 84 may comprises wings 106 extending upward and adapted to align the head-mount portion 92 of the second strut 84 to the I-beam 23 as an aid in maintaining alignment regardless of the vibrations the road trailer may undertake.

It is worth mentioning that, in the case of, e.g., the depicted embodiment wherein the first resilient strut 82 and the second strut 84 are independently mounted to the same I-beam 23 about a location, when the skirt panel 32 does not extend parallel to the centerline of the road trailer, the mountings of the skirt panel 32 to first resilient strut 82 and the second strut 84 are longitudinally offset from each other. Such offset does not prevent the resilient strut assembly 80 to be operating appropriately.

Figure 18:
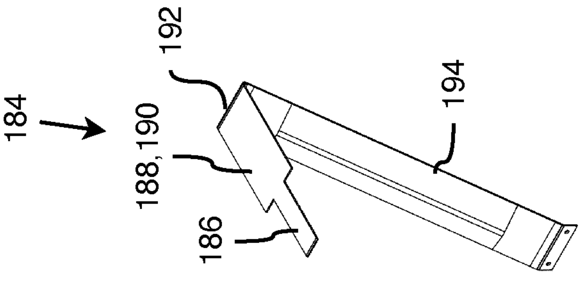
FIG. 18 is a front-oblique perspective view of the second strut of the resilient strut assembly of FIGS. 16 and 17.
Figure 17:
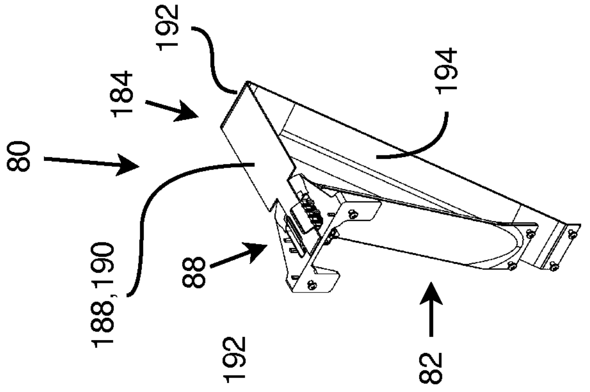
FIGS. 16 and 17 are respectively a side view and a front-oblique perspective view of a resilient strut assembly comprising a first resilient strut and second strut mounted at its head in concomitance with the first resilient strut in accordance with an embodiment.
Figure 16:
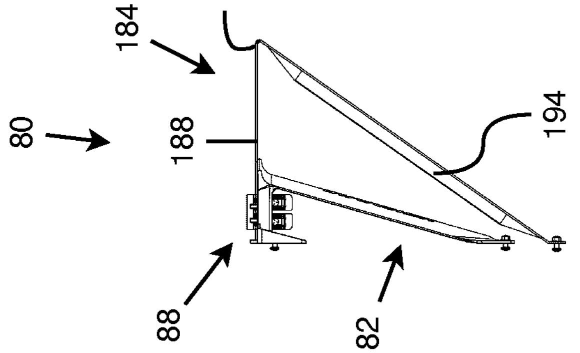

Referring to FIGS. 16 to 18, according to an embodiment, the resilient strut assembly 80 comprises a first resilient strut 82 and a second strut 184 adapted to be mounted concomitant to the I-beam of the road trailer. The second strut 184 comprises a wedge portion 186 adapted to be within the jaw components 88 of the first resilient strut 82 wedged between the first resilient strut 82 and the bottom flange of the I-beam.

Figure 22:
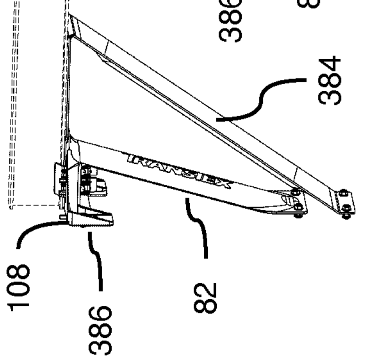
FIGS. 22 and 23 are respectively a side view and a front-oblique perspective view of a resilient strut assembly comprising a first resilient strut and second strut mounted at its head in concomitance with the first resilient strut to an I-beam featuring a lip in accordance with an embodiment.

In an embodiment, the second strut 184 comprises a head portion 188 comprising the wedge portion 186 and an extension 190 adapted to extend parallel to the bottom flange of the I-beams (similar as illustrated in relation with another embodiment on FIG. 22), and in some embodiments follow the bottom flange of the I-beam they are mounted thereto over a distance, where it connects to a joint 192 connected to the body 194.

It is worth realizing that this embodiment, and other embodiments (to be described) featuring concomitant mounting of a first resilient strut 82 and a second strut, e.g., second strut 184, to an I-beam allows to have the first resilient strut 82 and second strut 184 aligned and thus preventing the need to use wedges as discussed before.

Not illustrated, according to embodiments, the extension has a funnel shape where the narrow end is proximate to the first resilient strut and the wide end is distant from the first resilient strut, such that the extension is adapted to follow and contact the I-beam it is mounted thereto in all available mounting angles of the second strut to the I-beam.

Not illustrated, according to an embodiment, the extension features a non-flat shape (e.g., a V-shape or a U-shape) facing generally downward, such as the shaped hereinbefore described in relation with the body, e.g., body 194.

Figure 19:
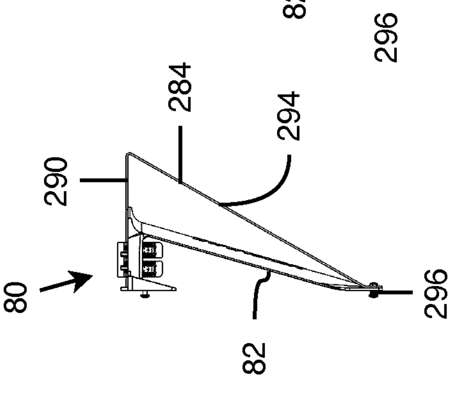
FIGS. 19 and 20 are respectively a side view and a front-oblique perspective view of a resilient strut assembly comprising a first resilient strut and second strut mounted at its head and at its bottom in concomitance with the first resilient strut in accordance with an embodiment.
Figure 20:
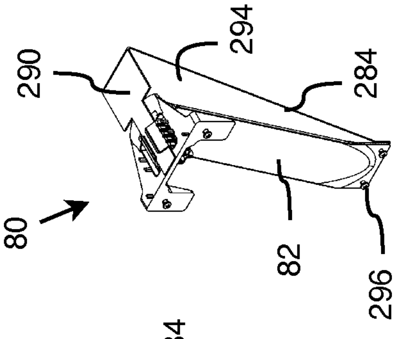
Figure 21:
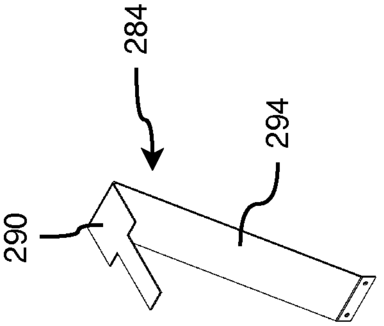
FIG. 21 is a front-oblique perspective view of the second strut of the resilient strut assembly of FIGS. 19 and 20.

Referring to FIGS. 19-21, an embodiment of a second strut 284 can feature a flat extension 290 and a flat body 294. The second strut 284 may further be adapted to be mounted concomitant with the first resilient strut 82 to the skirt panel. According to an embodiment, the first resilient strut 82 and the second strut 284 feature adjoining surfaces 296 that are compatible in shapes and holes, so that the holes are adapted to be aligned with each other and the holes of the skirt panel when mounting the skirt panel to both the first resilient strut 82 and the second strut 284 at the same time. According to a non-limiting embodiment, the compatibles adjoining surfaces 296 are flat surfaces.

Figure 23:
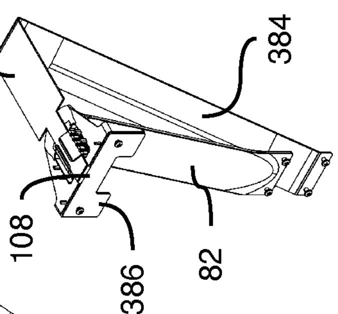
Figure 24:
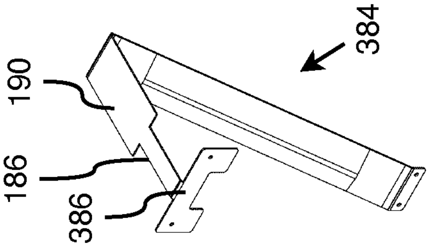
FIG. 24 is a front-oblique perspective view of the second strut of the resilient strut assembly of FIGS. 22 and 23.

Referring to FIGS. 22-24, an embodiment of the second strut 384 features a wedge portion 186 to be wedged between the first resilient strut 82 and the bottom flange of the I-beam 23. The wedge portion 186 extends on one side to a lip 386 adapted to butt out the front 108 of the first resilient strut 82, and on the other side to an extension 190 similar to the embodiments depicted on FIGS. 16-21. According to an embodiment, the lip 386 is wedged and even secured between the first resilient strut 82 and the skirt panel when the skit panel is secured to the first resilient strut 82.

Referring to FIGS. 32 and 33, regardless of the means used to mount, e.g., the second strut 284 at the top, the first resilient strut 82 and second strut 284 may be adapted to be concomitant in the skirt panel 32 being secured thereto. FIG. 32 depicts the use of a second strut 284 that is concomitant to the first resilient strut 82 in securing the skirt panel 32. FIG. 33 depicts the use of a third strut 484 extending e.g., parallel to, e.g., the second strut 284 and adapted for the skirt panel 32 to be secured thereto lower than to the other struts 82 & 284.

Figure 26:
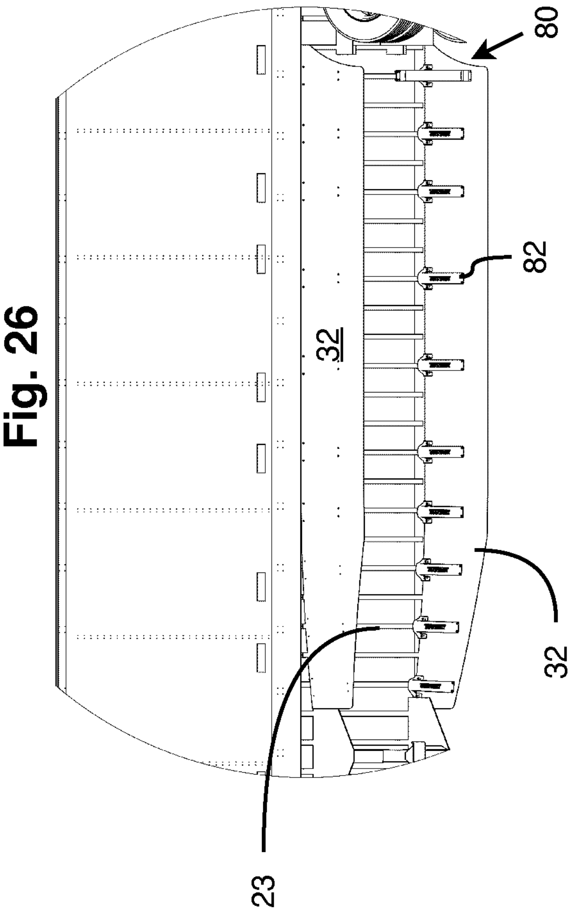
FIG. 26 is a bottom upward view of a portion of a road trailer with a pair of skirts mounted thereto according to the skirt mounting configuration of FIG. 25.
Figure 25:
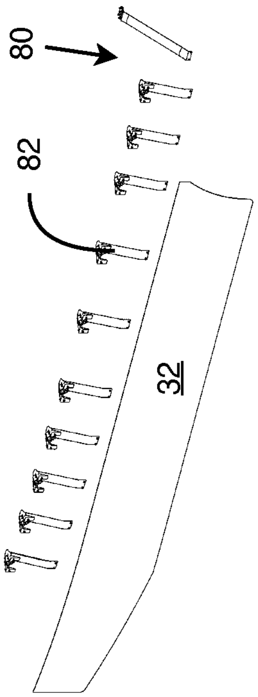
FIG. 25 is an exploded view of a skirt and struts, comprising a resilient strut assembly, used to secure the skirt to a road trailer in accordance with an embodiment.
Figure 27:
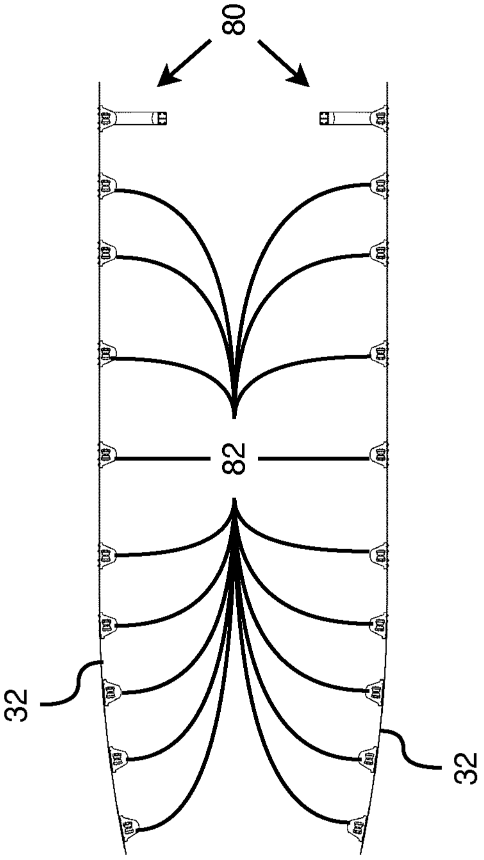
FIG. 27 is a bottom view schematic depicting the skirt mounting configuration of FIG. 25.

According to embodiments, as depicted on FIGS. 25, 26 and 27, a resilient strut assembly 80 may be used only when required to cap the possible deformation of the skirt panel 32. For instance, a single resilient strut assembly 80 comprising a first resilient strut and a second strut may be used to secure the rear portion of the skirt panel 32. Other support of the skirt panel 32 are provided uniquely through resilient struts.

Figure 28:
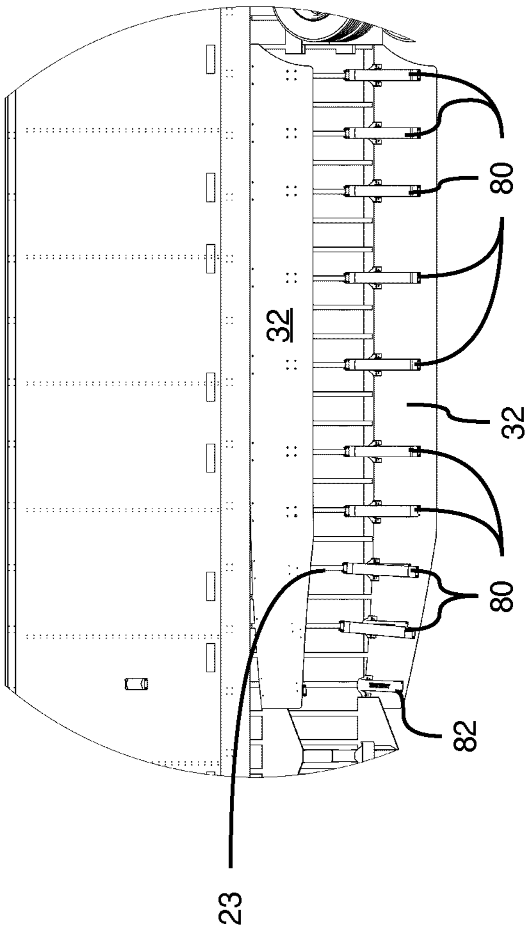
FIGS. 28 to 31 are a bottom upward view of a portion of a road trailer with a pair of skirts mounted thereto according to alternative skirt mounting configurations in accordance with embodiments.
Figure 29:
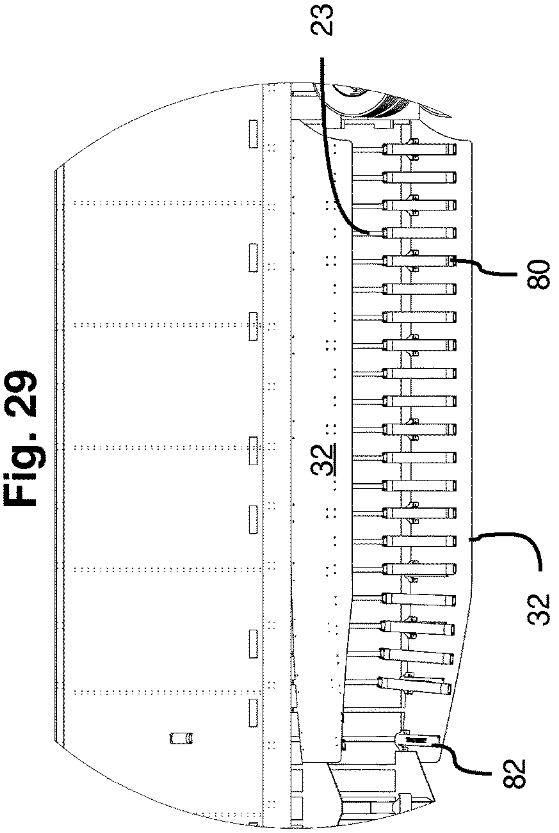
Figure 30:
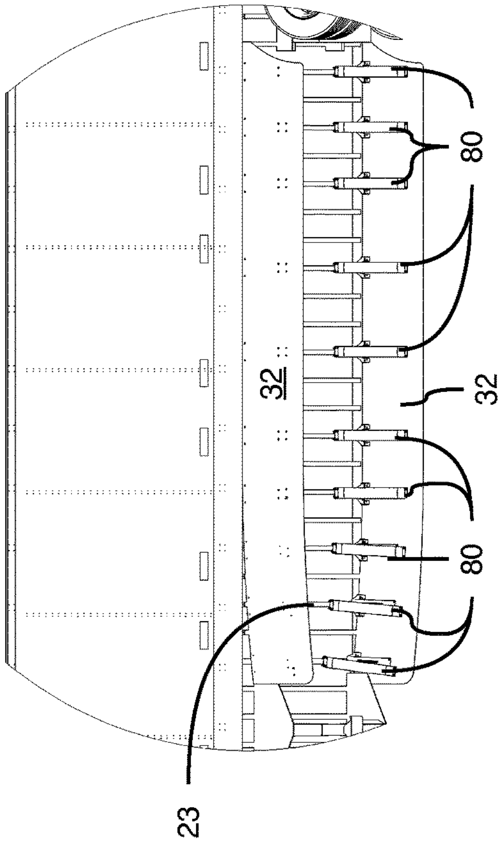
Figure 31:
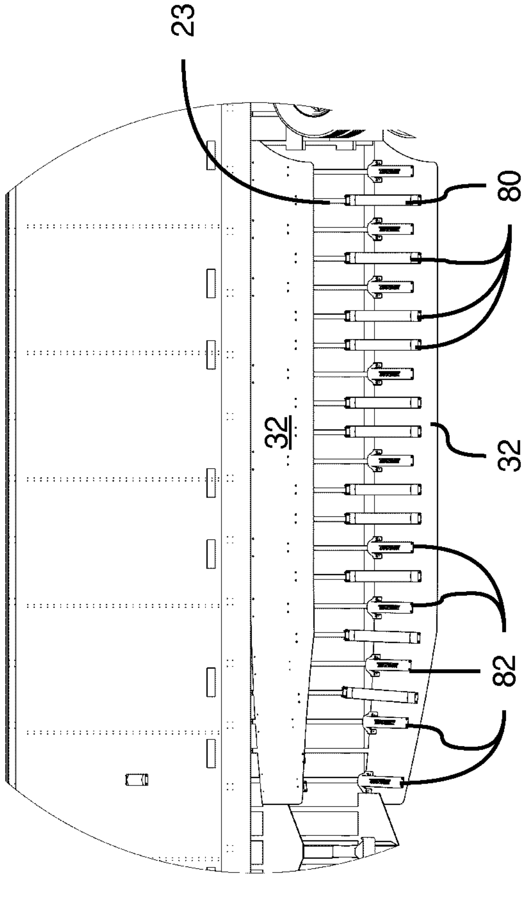

According to another embodiment, e.g., FIGS. 28 and 29, more than one resilient strut assembly 80 are used. For instance, a resilient skirt assembly 80 can be used to mount every extremity of the skirt panel 32 (not depicted), a resilient strut assembly 80 may be used at every mounting of the skirt panel 32 at all I-beams 23, see FIG. 29, or at some of the I-beams 23 available to mount to, see FIG. 30, or a resilient strut assembly 80 may be used, for example over a portion of its mounting, at every other mounting of the skirt panel 32, see FIG. 31.

According to embodiments generally depicted on FIG. 34 and FIGS. 35A to 35C, modifications to the skirt panel 32 may be performed to render the skirt panel 32 more rigid. One such modification comprises to secure a reinforcement longitudinal band 112 to the skirt panel 32. Depicted on FIGS. 35A to 35C, according to embodiments, the reinforcement band 112 may be mounted about the bottom, the center, or the top of the skirt panel 32. In embodiments, reinforcement bands 112 are used on at least two locations on at least a portion of the skirt panel 32.

Other reinforcement solutions (not depicted) comprise the skirt panel having a shape, e.g., a grove, extending longitudinally. Another one is having a bottom lip. These solutions described before, according to embodiments, may extend over a portion of the skirt panel limited to, e.g., a gap between two struts/resilient strut assemblies, or over more than a single gap up to the whole length of the skirt panel.

Referring to FIG. 36 and FIGS. 37A-E, localized reinforcement pieces may be used at the location where the skirt panel 32 is secured to a strut assembly 80. For examples, an embodiment of reinforcement pieces 122 may have a rectangular shape that may extend over the whole height of the skirt panel 32 or may ends higher than the bottom of the skirt panel 32. Another embodiment of reinforcement pieces 124 may also have e.g., a trapezoidal shape. Another embodiment of reinforcement pieces 126 may at first a rectangular shape that is tapered at one point when extending to the bottom. According to embodiments, the reinforcement material may feature lips 128 extending vertically (or horizontally at the bottom, not depicted) to provide extra reinforcement against flexion.

Referring to FIGS. 38A-38B and FIGS. 39A-39B, a strut combination may comprise a number of first resilient struts 82 and a number of second resilient struts 182 having different characteristics, with the first resilient struts 82 being used to secure the skirt panel at some locations, and the second resilient struts 182 being used to secure the skirt panel at other locations. For instance, the second resilient strut 182 may be longer, and have a greater resistance against flexion than the first resilient strut 82.

Still referring to FIGS. 38A-38B and FIGS. 39A-39B, a strut combination may comprise a number of resilient struts, e.g., resilient struts 82, wherein the some or all of the struts 82 are made with an alternative resin or having the thermoplastic material composing them reinforced with glass fibers. The alternative resin and/or the glass fiber improves the rigidity of the alternative resilient strut 82 compared with the nowadays used resilient strut 82.

Figure 40B:
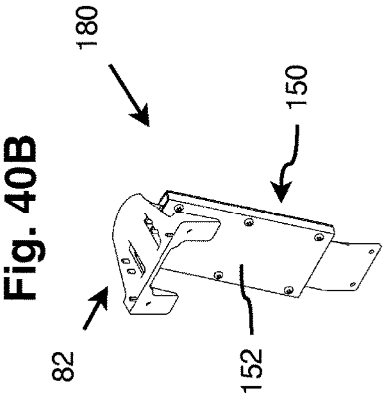
FIGS. 40A, 40B and 40C are respectively an exploded perspective view of a resilient strut assembly comprising a first resilient strut and a reinforcement assembly ready to be mounted thereto, the reinforcement assembly mounted thereto encapsulating the body of the resilient strut, and skirt mounted using the resilient strut assembly in accordance with an embodiment.
Figure 40A:
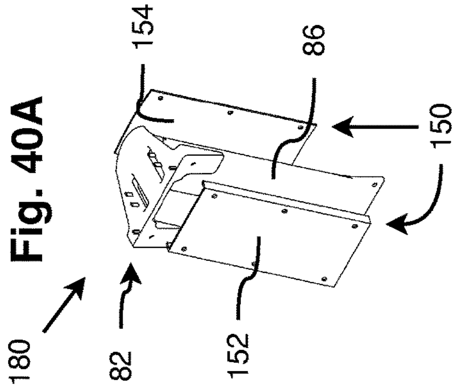
Figure 40C:
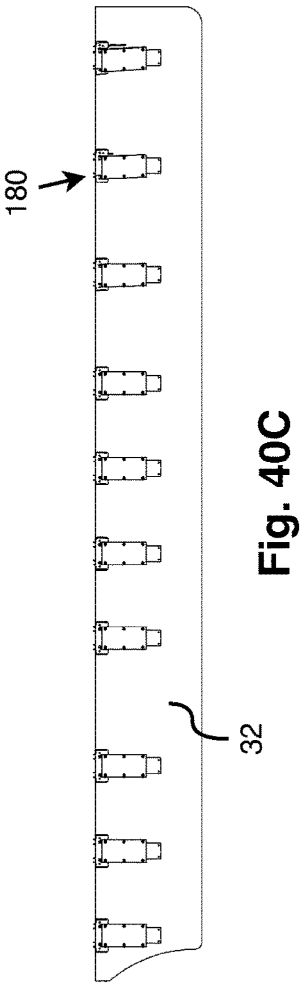
Figure 39B:
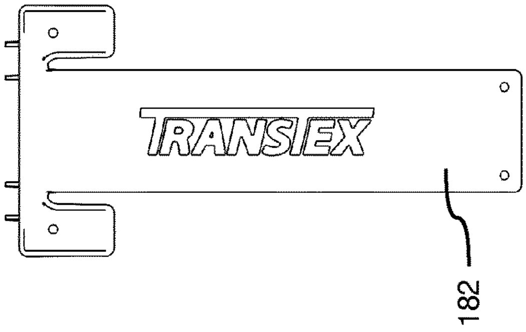
FIGS. 39A and 39B are rear view of the resilient struts of FIGS. 38A and 39A.
Figure 39A:
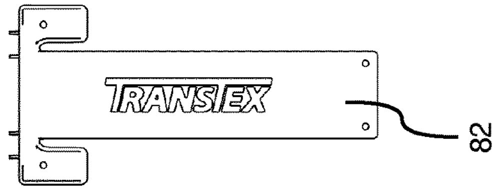

Referring to FIGS. 40A to 40C, according to an embodiment of a resilient strut assembly 180, a reinforcement assembly 150 may be mounted to the body 86 of the first resilient strut 82 to enhance its resistance against flexion at some locations while keeping the use of a single type of resilient strut. The reinforcement assembly 150, in one embodiment, comprises two pieces 152 & 154 that are adapted to be mounted to the body 86 of the first resilient strut 82. FIG. 40C depicts the use of such strut assembly 180 to mount a skirt panel 32.

In other embodiments (not depicted), reinforcement components may consist in a part clipped or otherwise secured to the face of the body of the resilient strut generally opposed to the skirt panel.

Figure 41A:
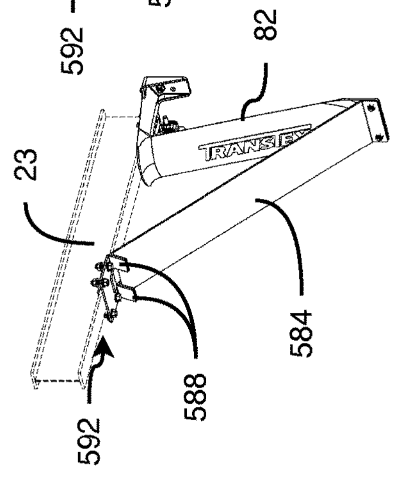
FIG. 41A is a perspective view of a resilient strut assembly mounted to an I-beam in accordance with an embodiment, wherein the resilient strut assembly adapted to act against only against flexion of the skirt toward the centerline of the vehicle.
Figure 41B:
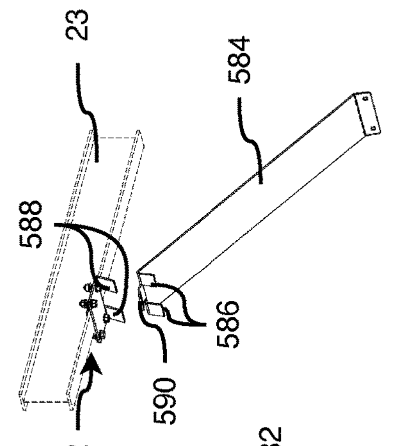
FIG. 41B is a perspective exploded view of the second strut of the resilient strut assembly of FIG. 41A with its head-mount portion mounted to an I-beam.

Referring to FIGS. 41A and 41B, according to one embodiment, a second strut 584 is, e.g., secured to the bottom of the resilient strut 82 (e.g., using the rivets used to secure the skirt) with a surface 586 at its top adapted to butt out a static part 588 when the skirt panel undertake a force toward the centerline of the road trailer, or after a first flexion of the skirt panel 30. The tongue 590 is adapted to be inserted between the jaw assembly 592 and the bottom flange of the I-beam 23, maintaining alignment of the second strut 584, while abutment surfaces 586 & 588 are adapted to abut against each other and limit the course of the tongue 590 in the jaw assembly 592 only when force is exerted on the other end toward the centerline. According to an embodiment, the angles of the surfaces 586 & 588 are set not parallel to each other, with their ends contacting first thereby offering a biasing/damping effect.

According to an embodiment (not depicted), the e.g., first resilient strut 82 and the e.g., second strut 584, are joined to the skirt at different heights (see e.g., FIGS. 16-18).

According to an embodiment (not depicted), a second strut related to the second strut on FIGS. 41A and 41B has its top (free sliding) interface mounted to the face of the first resilient strut opposed to the skirt panel. Thus, adjustment of the angle of the first resilient strut and of the second strut is performed in a single step.

It is worth noting that the latter embodiments limit only flexion/displacement of the bottom of the resilient members when pushed toward the centerline of the road trailer, the resilient member keeping the same characteristics when pulled away from the centerline.

Figure 42:
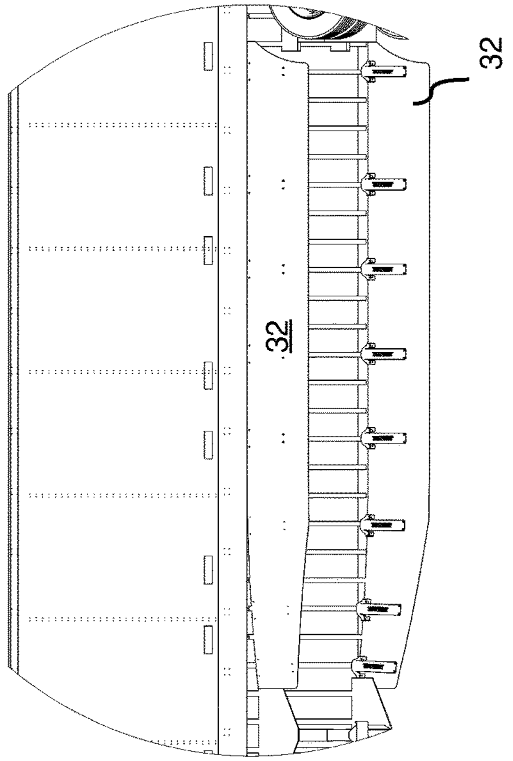
FIG. 42 is a bottom upward view of a portion of a road trailer with a pair of skirts mounted thereto using at least one enhanced resilient strut according to a skirt mounting configuration in accordance with an embodiment.
Figure 44:
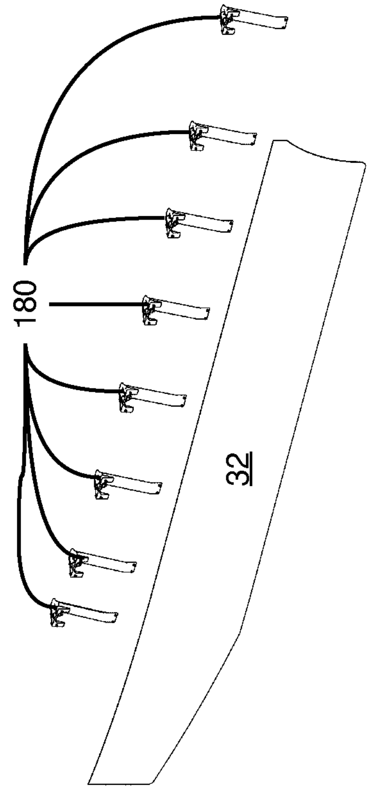
FIG. 44 is an exploded perspective view of a skirt and struts adapted to mount the skirt to a rad trailer in accordance with an embodiment.
Figure 43:
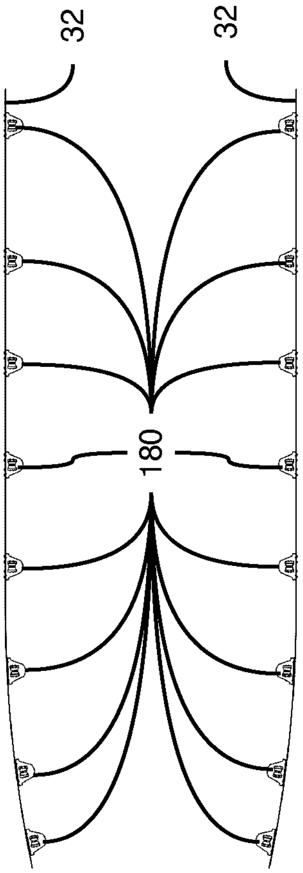
FIG. 43 is a bottom view schematic depicting the skirt mounting configuration of FIG. 42.

FIGS. 42 to 44 depict such a solution wherein a single type of resilient strut, e.g., strut 180 (depicted on FIGS. 40A and 40B), is used to secure the skirt panel 32. For general teaching, the resilient strut assemblies 180 are depicted before mounting e.g., reinforcement assembly 150, or any other embodiments of reinforcement (thus reinforcement voluntarily not depicted), to enhance resistance of some of the resilient struts, e.g., resilient strut 82.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A strut assembly adapted to mount a skirt panel to a vehicle having a floor and a longitudinal center plane, the strut assembly comprising:

a first resilient strut adapted to be mounted to the floor, the first resilient strut comprising at least one mounting portion adapted for the skirt panel to be secured thereto, wherein the first resilient strut is adapted to allow the skirt panel to flex between a flexed position, when undergoing an external force, and to self-restore to a default original position when the external force is released; and a complementary strut adapted to be coupled to at least two of a) the skirt panel, b) the first resilient strut, and c) the floor of the vehicle, wherein the complementary strut is adapted, when the external force is exerted over the skirt panel towards the center plane, for at least one of:

i) providing resistance to the skirt panel; and ii) limiting flexion of the skirt panel.

2. The strut assembly of claim 1, wherein the complementary strut operates only when the external force has a component directed toward the center plane of the vehicle.

3. The strut assembly of claim 1, wherein the complementary strut begins to operate only after the skirt panel has flexed over a threshold value greater than 0 compared to the default position.

4. The strut assembly of claim 1, wherein the complementary strut comprises a first end fixedly secured and a second end distant to the first end that is slidingly secured.

5. The strut assembly of claim 1, wherein the first resilient strut comprises a resilient-strut body adapted to extend at a first angle oblique relative to the skirt panel, and the complementary strut comprises a complementary-strut body that extends at a second angle oblique relative to the skirt panel.

6. The strut assembly of claim 5, wherein the first angle and the second angle are of different values.

7. The strut assembly of claim 5, wherein at least one end of the complementary strut is secured about an end of the body of the first resilient strut.

8. The strut assembly of claim 1, wherein the first resilient strut comprises a second mounting portion for mounting to the floor of the vehicle, and wherein the complementary strut comprises a wedge portion wedged between the second mounting portion and the floor of the vehicle.

9. The strut assembly of claim 1, wherein the first resilient strut is adapted to resiliently buckle when undergoing the force having a component over a threshold value towards the center plane, wherein the complementary strut is adapted to resist to the force at least one of i) limiting and ii) preventing the first resilient strut to buckle when combined to the first resilient strut.

10. The strut assembly of claim 1, wherein the first resilient strut comprises a body adapted to extend at a first angle oblique relative to the skirt panel, and the complementary strut comprises a body that extends parallel to the skirt panel.

11. The strut assembly of claim 1, wherein the complementary strut comprises a body to be mounted oblique to the floor and the skirt panel, and an extension to be mounted parallel to the floor.

12. The strut assembly of claim 1, wherein the first resilient strut comprises a second mounting portion for securing the skirt panel thereto distant to the first mounting portion, and wherein the complementary strut comprises a third mounting portion for securing the skirt panel thereto distant to the first mounting portion and to the second mounting portion.

13. The strut assembly of claim 1, wherein the complementary strut has a body having a non-flat shape.

14. The strut assembly of claim 13, wherein the non-flat shape comprises a concave face and a convex face opposed to the concave face.

15. A vehicle comprising a skirt panel and at least two strut assemblies as defined in claim 1, wherein the strut assemblies are mounted to the floor of the vehicle distant to each other, and wherein the skirt panel is secured to the two strut assemblies.

16. A vehicle comprising:

a floor;

a center plane;

a skirt-panel assembly comprising:

a resilient strut mounted to the floor;

a skirt panel secured to at least the resilient strut; and a complementary strut coupled to at least two of a) the skirt panel, b) the resilient strut, and c) the floor of the vehicle, wherein the resilient strut and the complementary strut are adapted, when undergoing an external force having a component toward the center plane, to allow the skirt panel of the vehicle to flex toward the center plane, and wherein the complementary strut prevents the skirt panel to flex over a threshold value beyond which the skirt-panel assembly loses ability to self-restore to the skirt panel to a default original position.

17. The vehicle of claim 16, comprising a first number of the resilient struts and a second number of the complementary struts, wherein the first number and the second number are unequal.

18. The vehicle of claim 16, wherein the skirt panel is coupled to the resilient strut at a first lowest height, and wherein the skirt panel is coupled to the complementary strut at a second lowest height that is not higher that the first lowest height.

19. The vehicle of claim 16, wherein the complementary strut comprises a first end secured to the skirt panel or to the resilient strut, and a second end distant from the first end that is coupled to one of the first resilient strut and the floor of the vehicle.

20. The vehicle of claim 16, wherein the complementary strut comprises a wedge portion that is wedged between the floor and the resilient strut.

* * * * *